United States Patent
Chen

(10) Patent No.: US 7,572,535 B2
(45) Date of Patent: *Aug. 11, 2009

(54) ION CONDUCTIVE COPOLYMERS CONTAINING ONE OR MORE HYDROPHOBIC OLIGOMERS

(75) Inventor: Jian Ping Chen, Palo Alto, CA (US)

(73) Assignee: Polyfuel, Inc., Mountain View, CA (US)

(*) Notice: Subject to any disclaimer, the term of this patent is extended or adjusted under 35 U.S.C. 154(b) by 678 days.

This patent is subject to a terminal disclaimer.

(21) Appl. No.: 10/987,951

(22) Filed: Nov. 12, 2004

(65) Prior Publication Data

US 2005/0234146 A1 Oct. 20, 2005

Related U.S. Application Data

(63) Continuation-in-part of application No. 10/438,299, filed on May 13, 2003, now Pat. No. 7,094,490.

(60) Provisional application No. 60/520,266, filed on Nov. 13, 2003, provisional application No. 60/545,293, filed on Feb. 17, 2004, provisional application No. 60/381,136, filed on May 14, 2002.

(51) Int. Cl.
| | |
|---|---|
| H01M 8/10 | (2006.01) |
| C08F 12/30 | (2006.01) |
| C08F 28/02 | (2006.01) |
| C08F 128/02 | (2006.01) |
| C08F 228/02 | (2006.01) |

(52) U.S. Cl. .................... 429/33; 429/30; 526/287
(58) Field of Classification Search .......... 429/30, 429/33; 526/287
See application file for complete search history.

(56) References Cited

U.S. PATENT DOCUMENTS

| | | | |
|---|---|---|---|
| 5,679,482 A | 10/1997 | Ehrenberg et al. | |
| 6,214,488 B1 | 4/2001 | Helmer-Metzmann et al. | |
| 6,586,561 B1 | 7/2003 | Litt et al. | |
| 6,610,789 B2 | 8/2003 | Watakabe et al. | |
| 6,761,989 B2 | 7/2004 | Terahara et al. | |
| 6,765,027 B2 | 7/2004 | Holdcroft et al. | |
| 6,825,310 B2 | 11/2004 | Goto et al. | |
| 6,979,515 B2 | 12/2005 | Fan et al. | |
| 6,986,960 B2 | 1/2006 | Oguri et al. | |
| 7,094,490 B2 * | 8/2006 | Cao et al. ................ | 429/33 |
| 2001/0021764 A1 | 9/2001 | Weisse et al. | |
| 2004/0096731 A1 | 5/2004 | Hama et al. | |

FOREIGN PATENT DOCUMENTS

| | | |
|---|---|---|
| EP | 1170310 A2 | 1/2002 |
| EP | 1449886 A | 8/2004 |
| JP | 2003147074 A | 5/2003 |
| WO | WO 02/103834 A1 | 12/2002 |
| WO | WO 03/030289 | 4/2003 |
| WO | WO 03/095509 A | 11/2003 |
| WO | WO 2004/042839 | 5/2004 |

OTHER PUBLICATIONS

An, Sung-Guk et al. "Morphology control of poly(phenylene oxide) by ionomeric poly(styrenesulfonic acid sodium salt) copolymers for fuel cell membrane" *Prepr. Pap. -Am. Chem. Soc. Div. Fuel Chem.* vol. 49(2) pp. 582-583 (2004).

Cao, et al. "Sulfonated copolymer for polymer electrolyte polymers and composite membrane therefrom" *Chem Abstract*, 139:396487 (2003).

Charnock, et al. "Preparation of ion conducting polymers and composite electrolyte membrane therefrom" *Chem Abstract*, 135:243473 (2001).

Ding, J. et al. "Solid Polymer Electrolytes Based on Ionic Graft Polymers: Effect of Graft Chain Length on Nano-Structured, Ionic Networks" *Adv. Funct. Matter* vol. 12, No. 5, pp. 389-394 (2002).

Ding. J. et al. "A Self-organized Network of Nanochannels Enhances Ion Conductivity through Polymer Films" *Am. Chem. Soc.* vol. 13, No. 7, pp. 2231-2233 (2001).

Ghassemi, H. et al. "New multiblock copolymers of sulfonated poly(4'-phenyl-2,5-benzophene) and poly(arylene ether sulfone) for proton exchange membrane" *Polymer Preprints* vol. 44(1), pp. 814-815 (2003).

Jung, D. et al. "A Performance evaluation of direct methanol fuel cell using impregnated tetraethyl-orthosilicate in cross-linked polymer membrane" *Int. Journal of Hydrogen Energy*, vol. 26, pp. 1263-1269 (2001).

Kim, J. et al. "Proton conductivities and methanol permeabilities of membranes made from partially sulfonated polystyrene-block-poly(etheylene-ran-butylene)-block-polystyrene copolymers" *Journal of Membrane Science* vol. 207, pp. 129-137 (2002).

Mecham, J. "Direct Polymerization of sulfonated poly(arylene ether) random copolymers and poly(imide) sulfonated poly (arylene ether) segmented copolymers: new candidates for proton exchange membrane fuel cell material systems" *Disseration Submitted to the Faculty of Virginia Polytechnic Inst. and State Univ.* Apr. 23, 2001, Blacksburg, VA.

Savadogo, O. "Emerging membranes for electrochemical systems Part II. High temperature composite membranes for polymer electrolyte fuel cell (PEFC) applications" *Journal of Power Sources* vol. 127, pp. 135-161 (2004).

(Continued)

*Primary Examiner*—Patrick Ryan
*Assistant Examiner*—Julian Mercado
(74) *Attorney, Agent, or Firm*—Morgan, Lewis & Bockius LLP; Richard F. Trecartin

(57) ABSTRACT

In one aspect, the invention provides ion conductive copolymers comprising (1) a plurality of first oligomers, (2) a plurality of second oligomers, (3) ion conductive monomers and (4) linking monomers. The oligomers preferably are hydrophobic and together with the ion conductive monomers are randomly dispersed between the linking monomers. Uses of such polymeric materials include the formation of polymer electrolyte membranes (PEMs), catalyst coated membranes (CCM's) and membrane electrolyte assemblies (MEA's) which may be used in fuel cells and the like.

20 Claims, 5 Drawing Sheets

OTHER PUBLICATIONS

Scanlon, E. "Polybenzimidazole based segmented block copolymers for high temperature fuel cell membranes" *Prepr. Pap.-Am. Chem. Soc. Div. Fuel Chem*. vol. 49(2) pp. 522-523 (2004).

Wang, H. et al. "Synthesis of Substituted Poly(P-Phenlyene)s by Nickel (0) Catalyzed Coupling Reaction and Derived Multiblock Copolymers for Proton Exchange Membrane Fuel Cells" *Prepr. Pap.-Am. Chem. Soc. Div. Fuel Chem*. vol. 49(2), pp. 586-587 (2004).

Wiles, K. et al. "Disulfunated Poly(arylene ether phenyl phosphine oxide sulfone) terpolymers for pem fuel cell systems" *Prepr. Pap.-Am. Chem. Soc. Div. Fuel Chem* vol. 49(2), pp. 538-540 (2004).

Won, J. et al. "Fixation of Nanosized Proton Transport Channels in Membranes" *Am. Chem. Soc*. vol. 36, p. 3228-3234 (2003).

Xing, P. et al. "Towards a Greener World: Conference Proceedings, Hydrogen and Fuel Cells, Conference and Trade Show" *Westpoint Conference Services* 2003 pp. 93-102.

\* cited by examiner

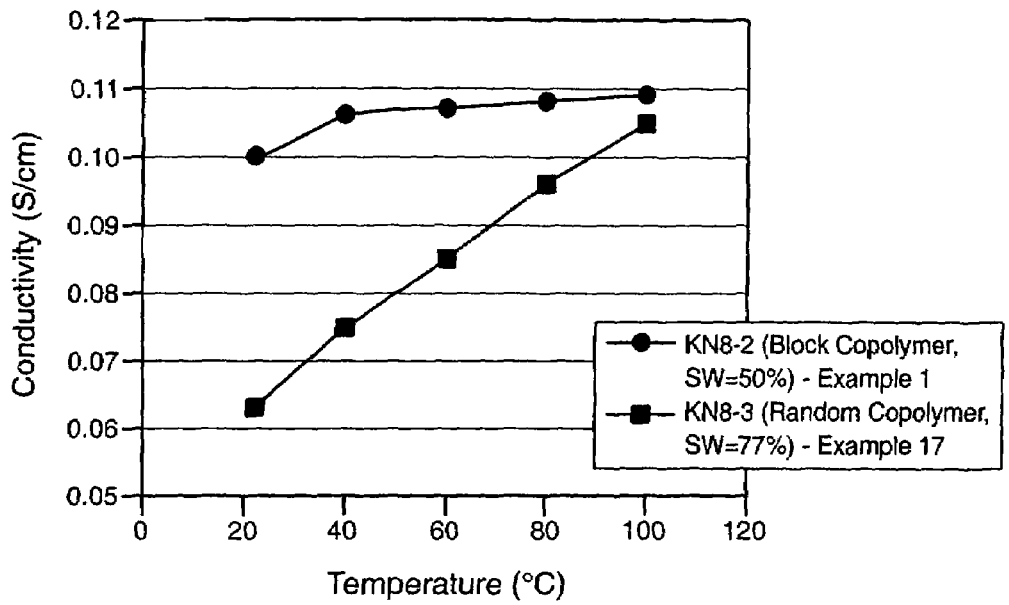
FIG._1
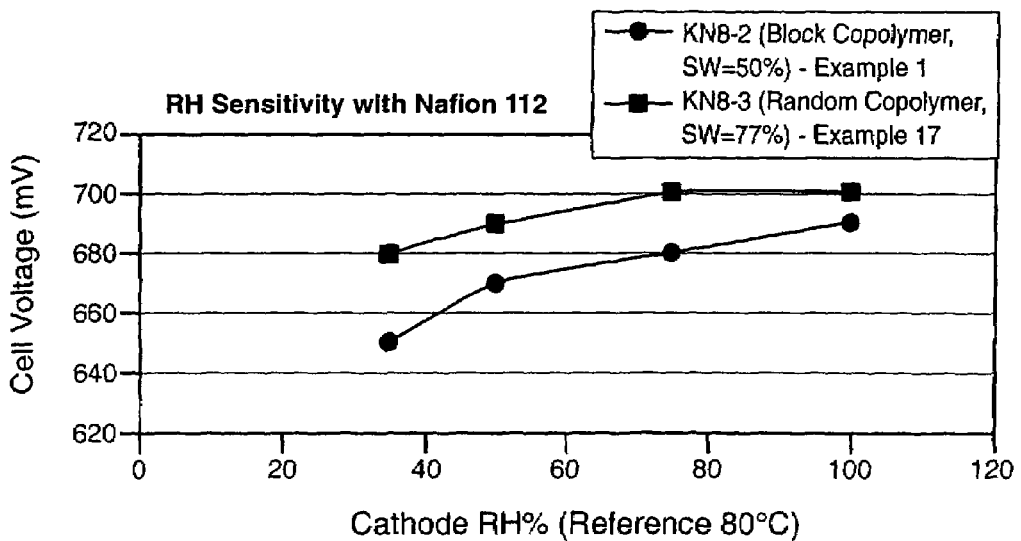
FIG._3

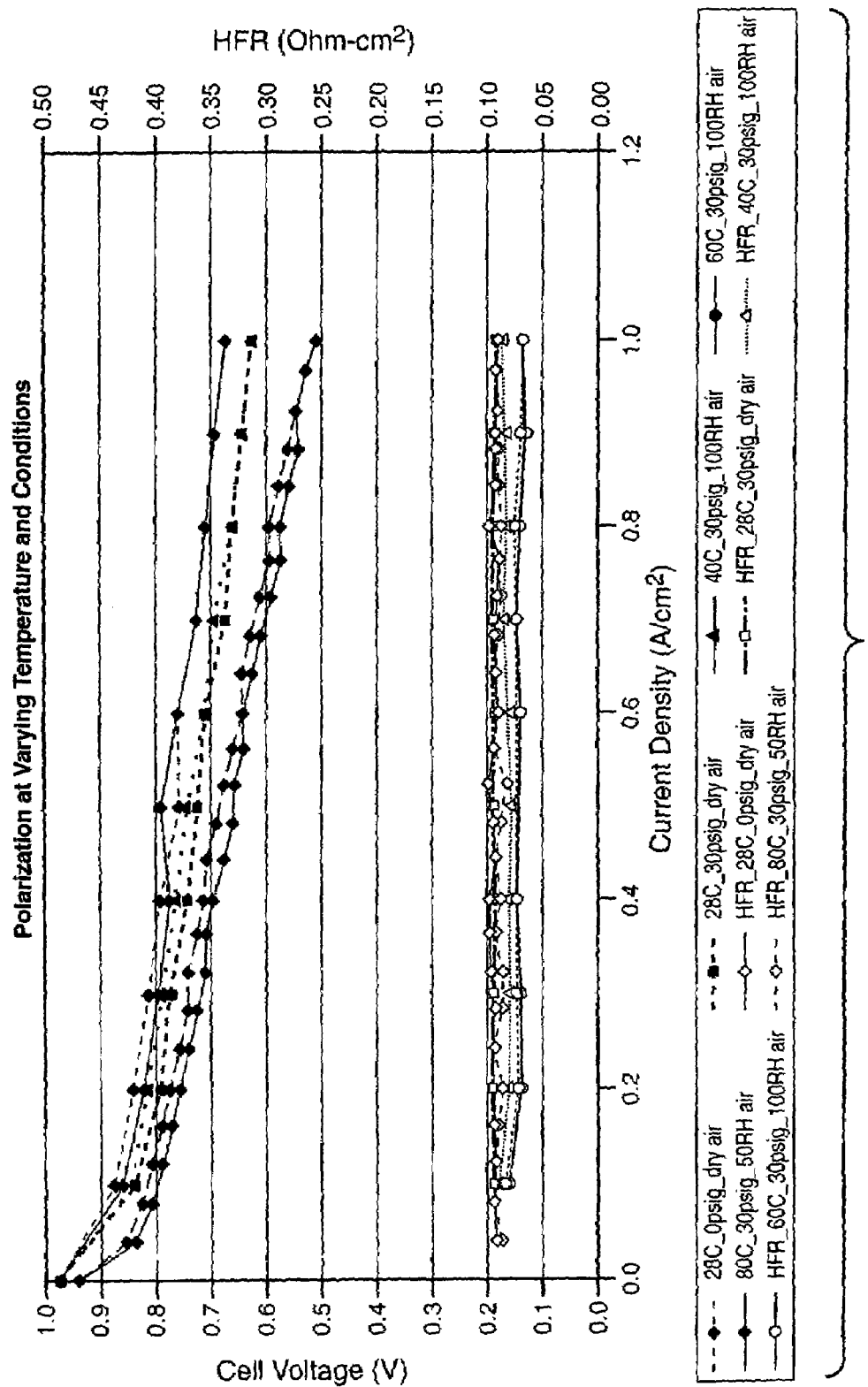
FIG._2

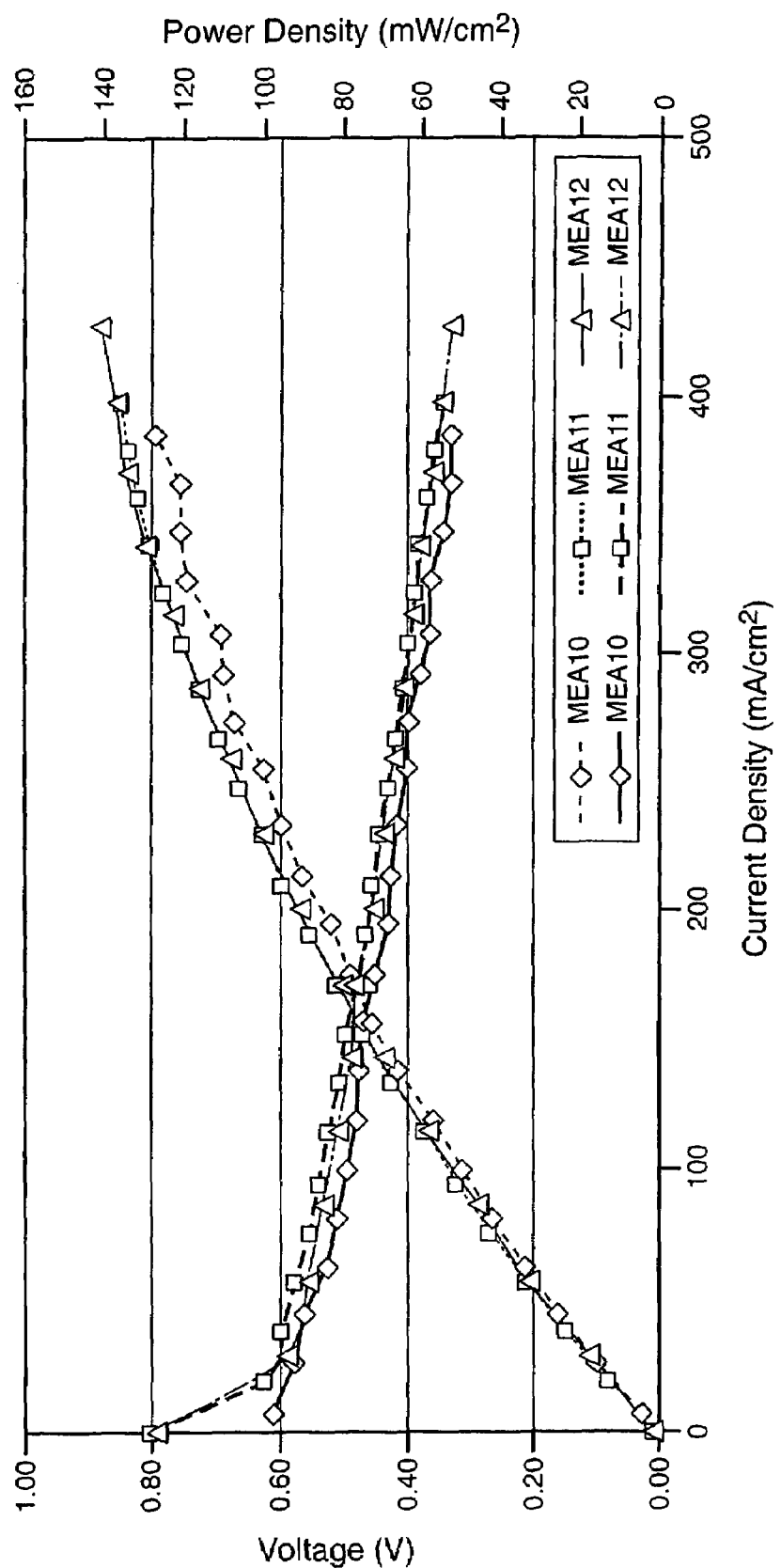
FIG._4

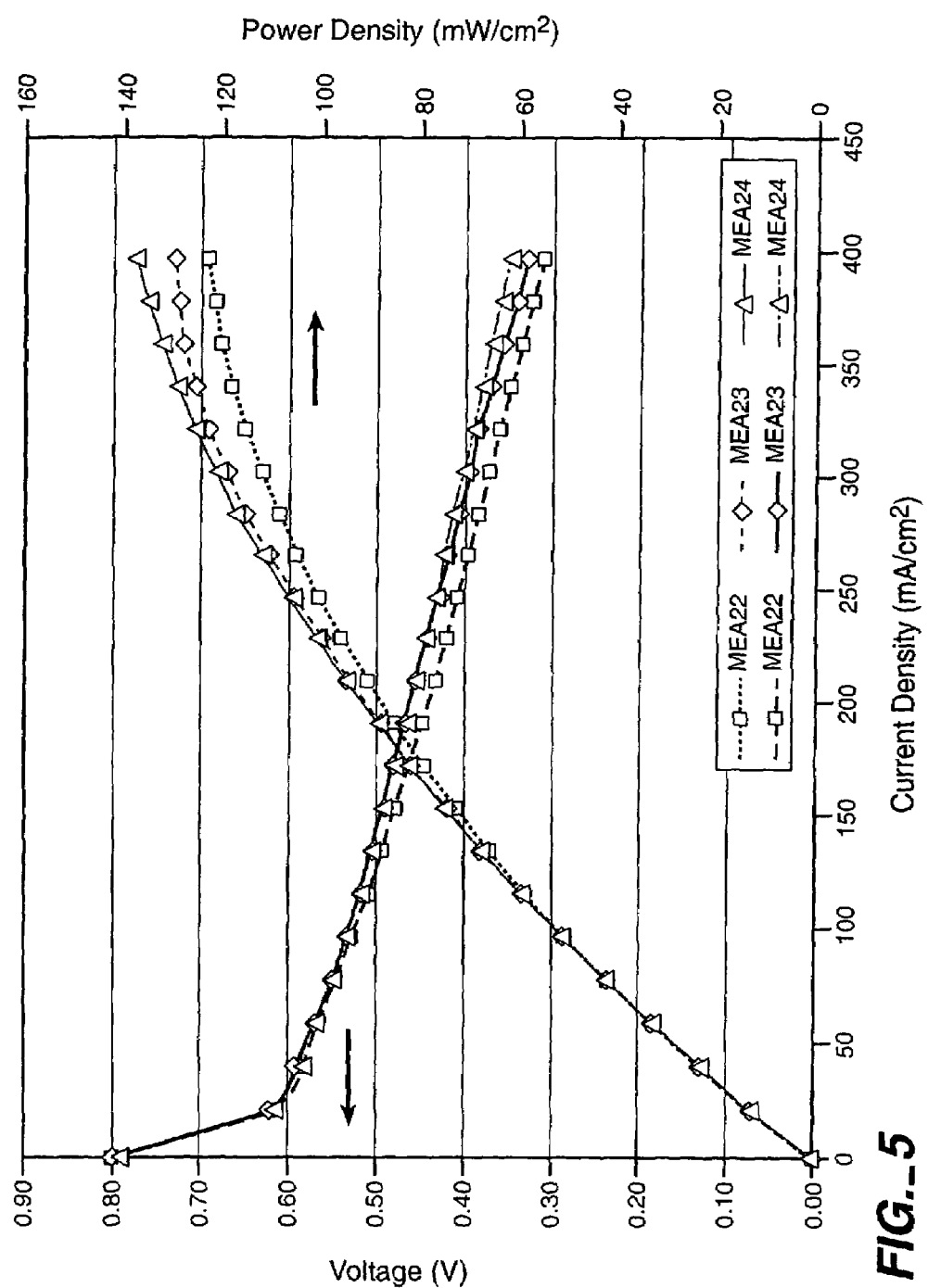
FIG._5

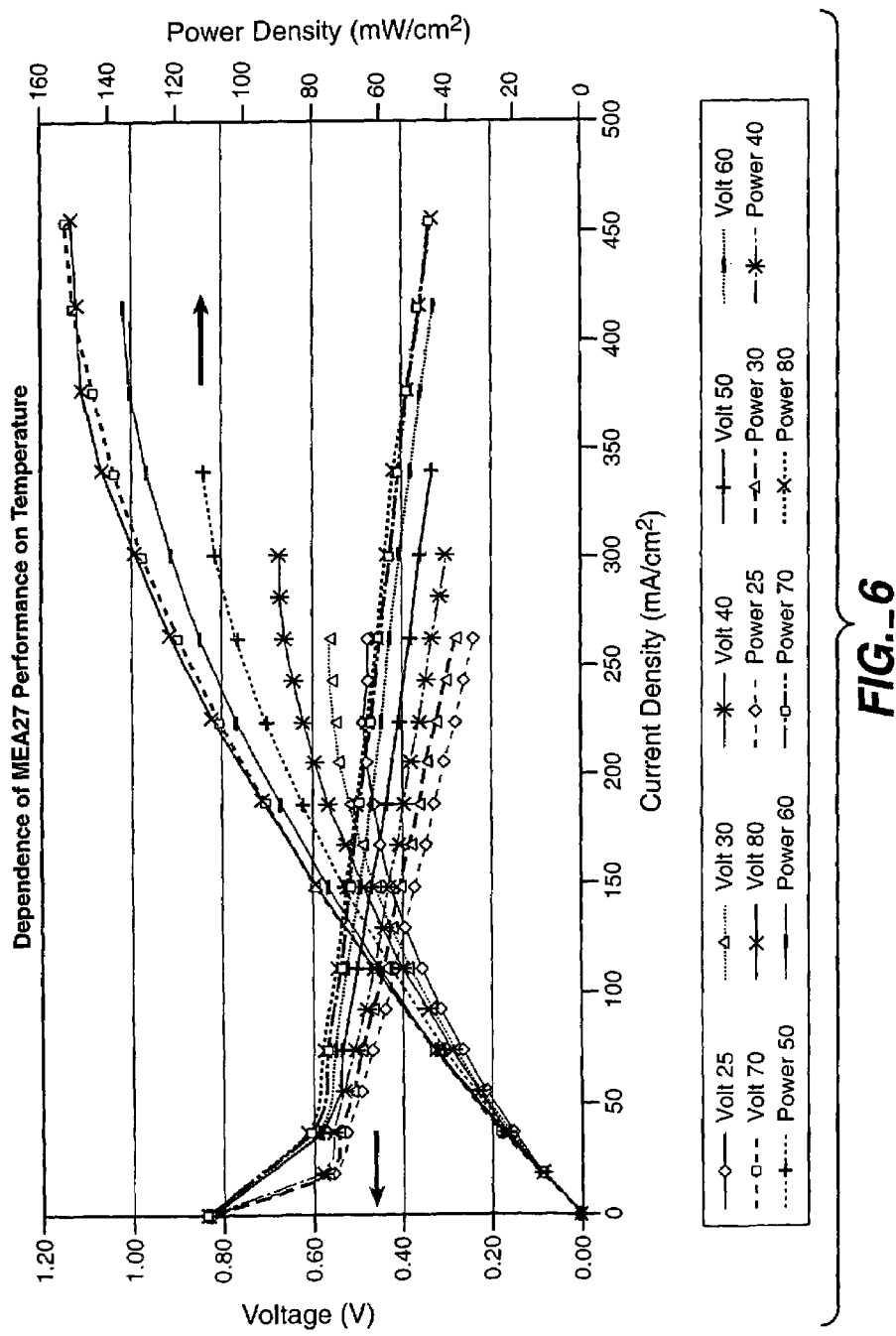
FIG._6

ION CONDUCTIVE COPOLYMERS CONTAINING ONE OR MORE HYDROPHOBIC OLIGOMERS

RELATED APPLICATION

This Application is a continuation-in-part of U.S. application Ser. No. 10/438,299, filed May 13, 2003 and now U.S. Pat. No. 7,094,490, which claims benefit under 35 O.K. §119 of U.S. Provisional Application Ser. No. 60/381,136, filed May 14, 2002. This application also claims benefit of under O.K. §119 to U.S. Provisional Applications Ser. No. 60/520, 266, filed Nov. 13, 2003, and U.S. Provisional Application Ser. No. 60/545,293, filed Feb. 17, 2004, all of which are incorporated by reference herein.

TECHNICAL FIELD

This invention relates to ion conductive polymers which are useful in forming polymer electrolyte membranes used in fuel cells.

BACKGROUND OF THE INVENTION

Fuel cells have been projected as promising power sources for portable electronic devices, electric vehicles, and other applications due mainly to their non-polluting nature. Of various fuel cell systems, the polymer electrolyte membrane based fuel cell technology such as direct methanol fuel cells (DMFCs) have attracted much interest thanks to their high power density and high energy conversion efficiency. The "heart" of a polymer electrolyte membrane based fuel cell is the so called "membrane-electrode assembly" (MEA), which comprises a proton exchange membrane (PEM), catalyst disposed on the opposite surfaces of the PEM to form a catalyst coated membrane (CCM) and a pair of electrodes (i.e., an anode and a cathode) disposed to be in electrical contact with the catalyst layer.

Proton-conducting membranes for DMFCs are known, such as Nafion® from the E.I. Dupont De Nemours and Company or analogous products from Dow Chemicals. These perfluorinated hydrocarbon sulfonate ionomer products, however, have serious limitations when used in high temperature fuel cell application Nafion® loses conductivity when the operation temperature of the fuel cell is over 80° C. Moreover, Nafion® has a very high methanol crossover rate, which impedes its applications in DMFCs.

U.S. Pat. No. 5,773,480, assigned to Ballard Power System, describes a partially fluorinated proton conducting membrane from α, β, β-trifluorostyrene. One disadvantage of this membrane is its high cost of manufacturing due to the complex synthetic processes for monomer α, β, β-trifluorostyrene and the poor sulfonation ability of poly (α, β, β-trifluorostyrene). Another disadvantage of this membrane is that it is very brittle, thus has to be incorporated into a supporting matrix.

U.S. Pat. Nos. 6,300,381 and 6,194,474 to Kerrres, et al. describe an acid-base binary polymer blend system for proton conducting membranes, wherein the sulfonated poly(ether sulfone) was made by post-sulfonation of the poly (ether sulfone).

M. Ueda in the Journal of Polymer Science, 31(1993): 853, discloses the use of sulfonated monomers to prepare sulfonated poly(ether sulfone polymers).

U.S. patent application US 2002/0091225A1 to McGrath, et al. used this method to prepare sulfonated polysulfone polymers.

The need for a good membrane for fuel cell operation requires balancing of various properties of the membrane. Such properties included proton conductivity, fuel-resistance, chemical stability and fuel crossover especially for high temperature applications, fast start up of DMFCs, and durability of cell performance. In addition, it is important for the membrane to retain its dimensional stability over the fuel operational temperature range. If the membrane swells significantly, it will increase fuel crossover, resulting in degradation of cell performance. Dimensional changes of the membrane also put stress on the bonding of the catalyst membrane-electrode assembly (MEA). Often this results in delamination of the membrane from the catalyst and/or electrode after excessive swelling of the membrane. Therefore, it is necessary to maintain the dimensional stability of the membrane over a wide temperature range and minimize membrane swelling.

SUMMARY OF THE INVENTION

The invention provides ion conductive copolymers which can be used to fabricate proton exchange membranes (PEM's), catalyst coated proton exchange membranes (CCM's) and membrane electrode assemblies (MEA's) which are useful in fuel cells and their application in electronic devices, power sources and vehicles.

In one aspect, the ion conductive copolymers comprise at least one hydrophobic oligomer (sometimes referred to as segments or block polymers) that is randomly dispersed in a polymeric backbone comprising one or more ion conducting monomers. In another aspect, the ion conductive polymer comprises at least two different hydrophobic monomers randomly dispensed in the polymer backbone. In a preferred embodiment, a linking monomer is used to link the oligomer and ion conducting monomer.

If two hydrophobic oligomers are used, the first oligomer preferably comprises a first monomer and a second monomer whereas the second oligomer comprises third and fourth monomers. In one aspect, the oligomers are hydrophobic. In another aspect, one of the first or second oligomer is a hard polymer relative to the other.

The ion conductive monomers comprise a monomer and an ion conductive group such as a sulfonic acid group. In some embodiments, the same monomer that does not contain an ion conductive group can be used as the linking monomer in combination with the ion conductive monomer to control the degree to which the copolymer contains ion conductive groups. Alternatively, the linking monomer is structurally distinct, i.e., different from the ion conducting monomer. The relative amounts of monomers and oligomers used to synthesize the copolymer can be varied to control the relative amount of ion conductive groups in the copolymer.

Prior to synthesis, each of the first oligomer, second oligomer and ion conductive monomer contain leaving groups, such as halides, at their distal ends. The linking monomer, on the other hand, comprises two displacement groups such as phenoxide, alkoxide or sulfide associated with aromatic monomers. Upon reaction of the linking monomer with each of the first oligomer, second oligomer and ion conductive monomer, the displacement groups and the leaving groups react to form a plurality of different motifs within the ion conductive polymer. Alternatively, the first oligomer, second oligomer and ion conducting monomer comprise displacement groups and the linking monomer comprises leaving groups.

A first hydrophobic oligomer can be represented by the formula $(AB)_mA$ or $(BA)_mB$. A second hydrophobic oligomer can be represented by the formula $(CD)_nC$ or $(DC)_nD$. Each of these oligomers are randomly distributed in an ion conductive polymer backbone to form a copolymer that can be represented by Formula I $$-((Ar_1X_1-Ar_2-X_2Ar_3-X_3)_m-Ar_1X_1-Ar_2-)_a/$$
$$((-Ar_4-X_4-Ar_5-X_5-Ar_6-X_6)_n-Ar_4-$$
$$X_4-Ar_5-)_b/(Ar_7-X_7-Ar_8)_c-R_1-Ar_9-Y-$$
$$Ar_{10}-R_2-$$  Formula I where the first group $(Ar_1X_1-Ar_2-X_2Ar_3-X_3)_m-Ar_1X_1-Ar_2-$ corresponds to $(AB)_mA$, the second group $(Ar_4-X_4-Ar_5-X_5-Ar_6-X_6)_n-Ar_4-X_4-Ar_5-$ corresponds to $(CD)_nC$, where $(AB)_mA$ and $(CD)_nC$ may be the same or different. $(Ar_7-X_7-Ar_8)$ is a monomer that is modified to contain an ion conducting group and $R_1-Ar_9-Y-Ar_{10}-R_2-$ is a linking monomer. In a preferred embodiment, $(AB)_mA$ and $(CD)_nC$ are different.

In this formula, $Ar_1, Ar_2, Ar_4, Ar_5, Ar_7, Ar_8, Ar_9, Ar_{10}$, are independently phenyl, substituted phenyl napthyl, terphenyl, aryl nitrile, substitute aryl nitrile, and one or more of $Ar_7$ and/or one or more of $Ar_8$ further comprise one or more pendant an ion conducting groups, $X_1$ and $X_4$ are independently $-C(O)-$ or $-S(O)_2$, $X_2, X_3, X_5$ and $X_6$ are independently $-O-$ or $-S-$; $X_7$ is a bond, $-C(O)-$ or $S(O)_2-$.

$Ar_3$ and $Ar_6$ are the same or different from each other and are

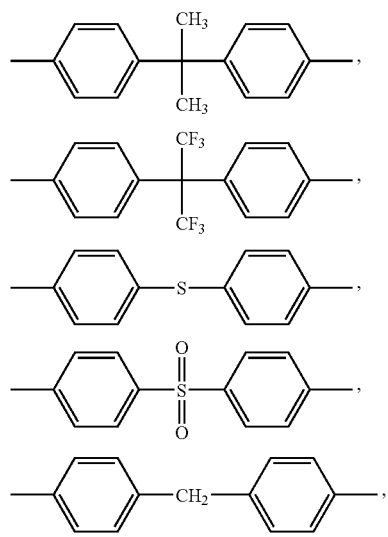

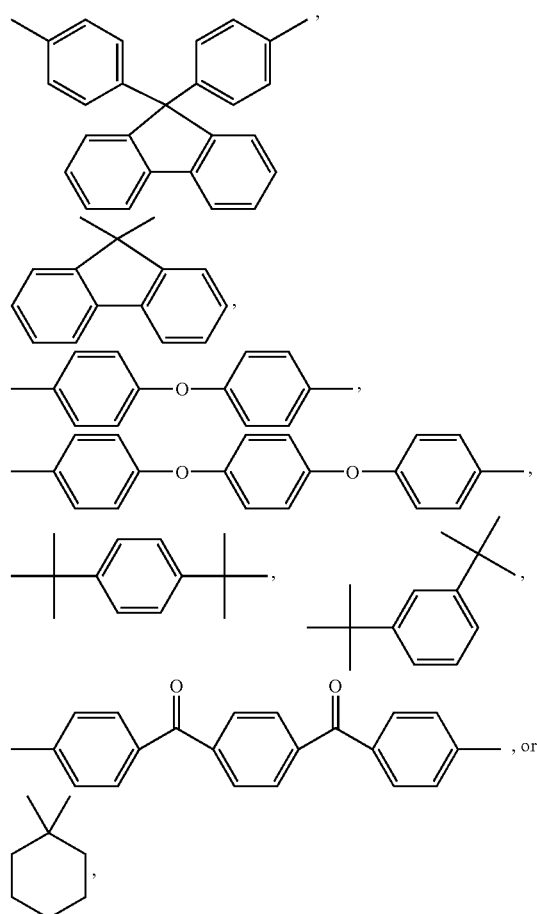

wherein the ion conductive group comprises $-SO_3H$, $-COOH$, $-HPO_3H$ or $-SO_2NH-SO_2-RF$ where RF is a perfluorinated hydrocarbon having 1-20 carbon atoms and said ion conducting group are pendant to the copolymer backbone;

$R_1$ and $R_2$ are independently $-O-$ or $-S-$.

wherein a, b and c are independently between 0.01 and 0.98 and a+b+c=1, wherein m is between 1 and 12, n is between 1 and 12, and wherein Y is a bond, $-C(O)-$, or $-S(O_2)-$, and $Ar_{10}$ may be present or absent when Y is a bond.

In some embodiments utilizing a single hydrophobic oligomer, when the ion conducting monomer used to make the copolymer is SBisK, the linking monomer is not BisK.

In some embodiments of this or other formulas herein, at least one of m or n=1. In other embodiments, m and n are each at least 2.

The first oligomer $-(Ar_1X_1-Ar_2-X_2Ar_3-X_3)_m-Ar_1X_1-Ar_2-$; the second oligomer $(Ar_4-X_4-Ar_5-X_5-Ar_6-X_6)_n-Ar_4-X_4-Ar_5-$, and the ion conducting monomer $Ar_7-X_7-Ar_8$ are randomly linked via linking monomer $R_1-Ar_9-Y-Ar_{10}-R_2-$.

In other embodiments, three or more different hydrophobic oligomers are used.

A particular preferred copolymer of the invention comprises Formula II:

Formula II
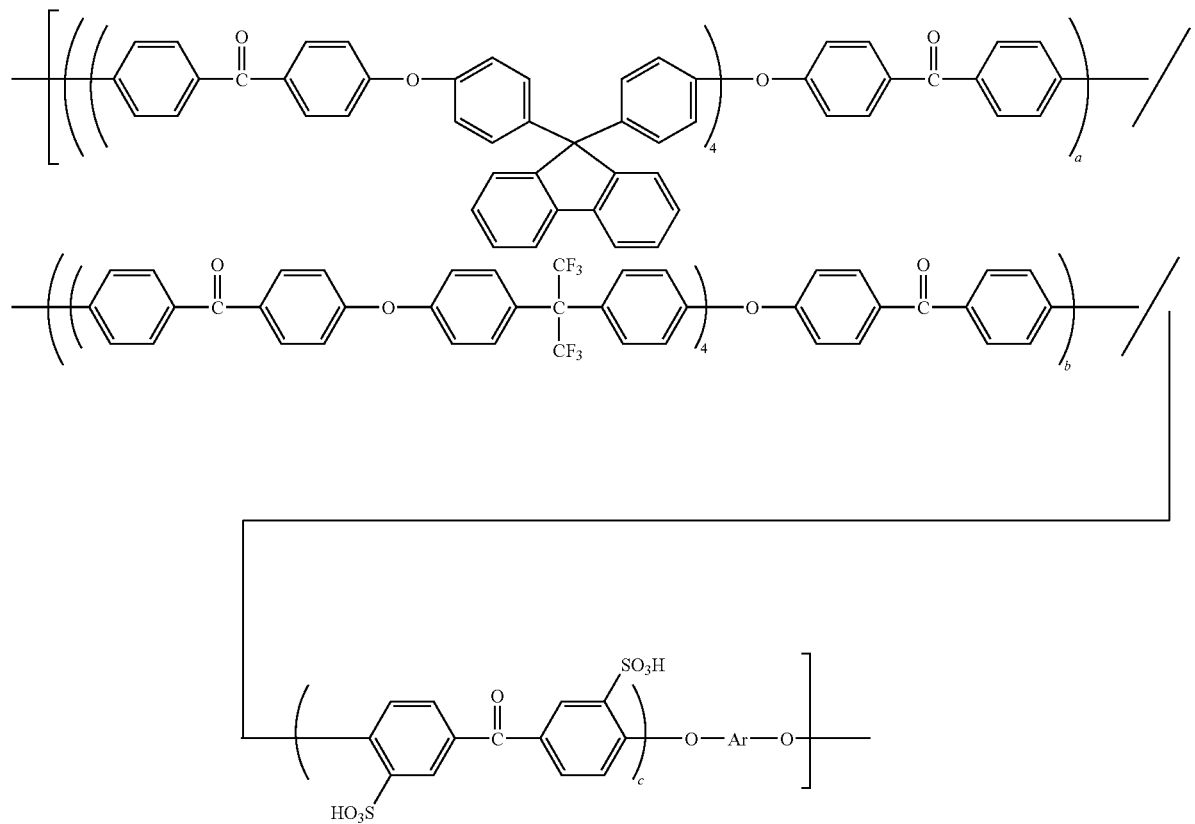
wherein Ar is:
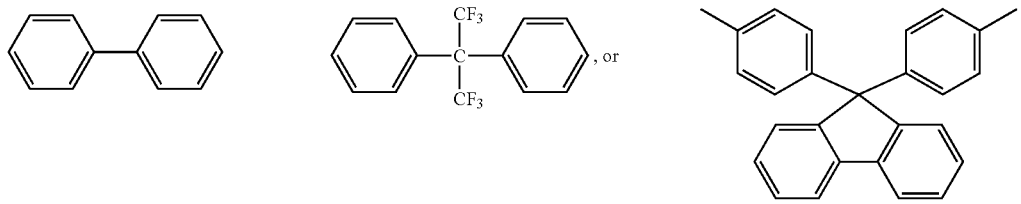
and wherein a is between 0.05 and 0.2, b is between 0.01 and 0.2 and c is between 0.5 and 0.95. In a preferred embodiment, a=0.13, b=0.036 and c=0.83.
In another preferred embodiment the invention comprises a copolymer of Formula III.
Formula III
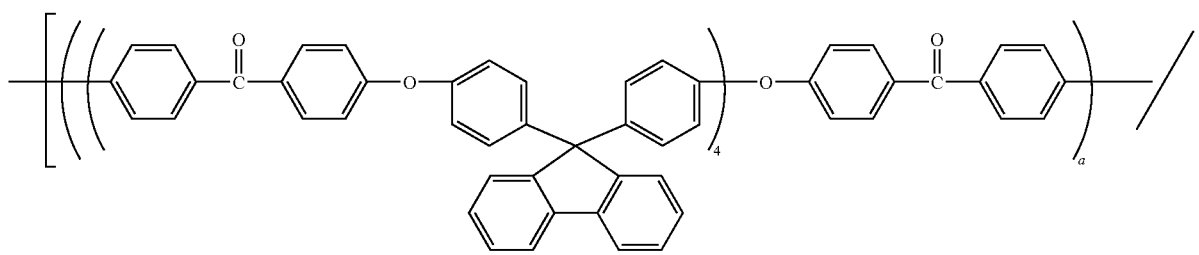

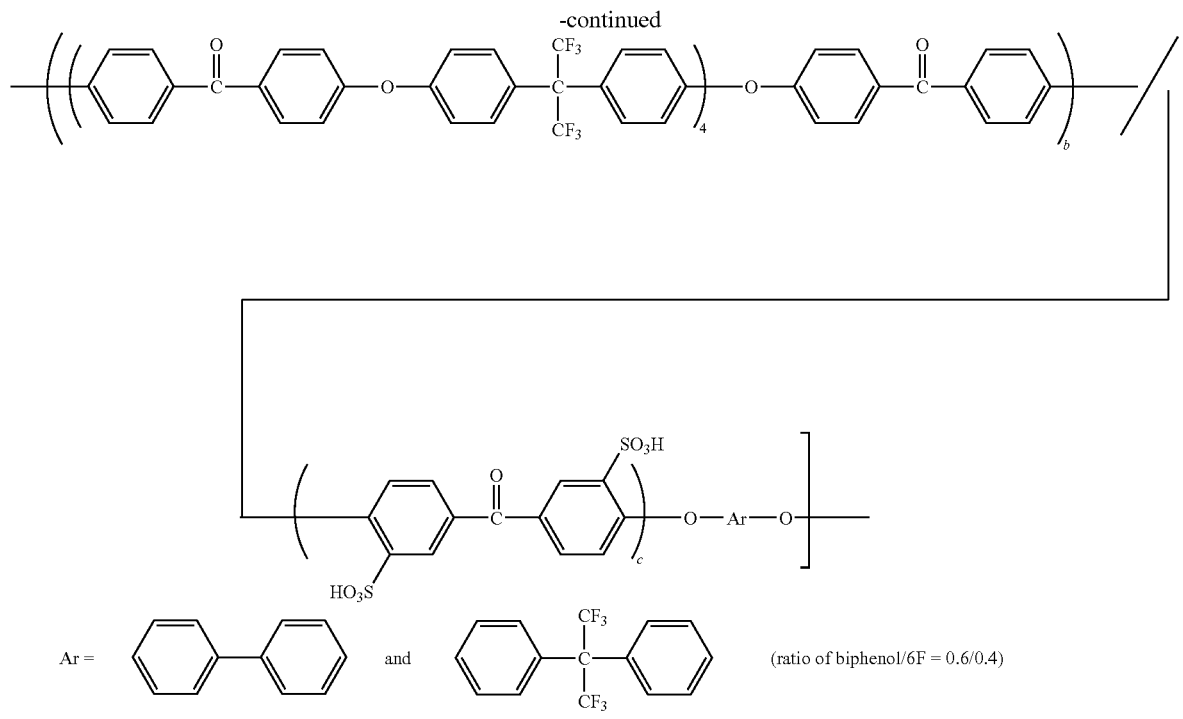
Another preferred embodiment is the copolymer of Formula IV.
Formula IV
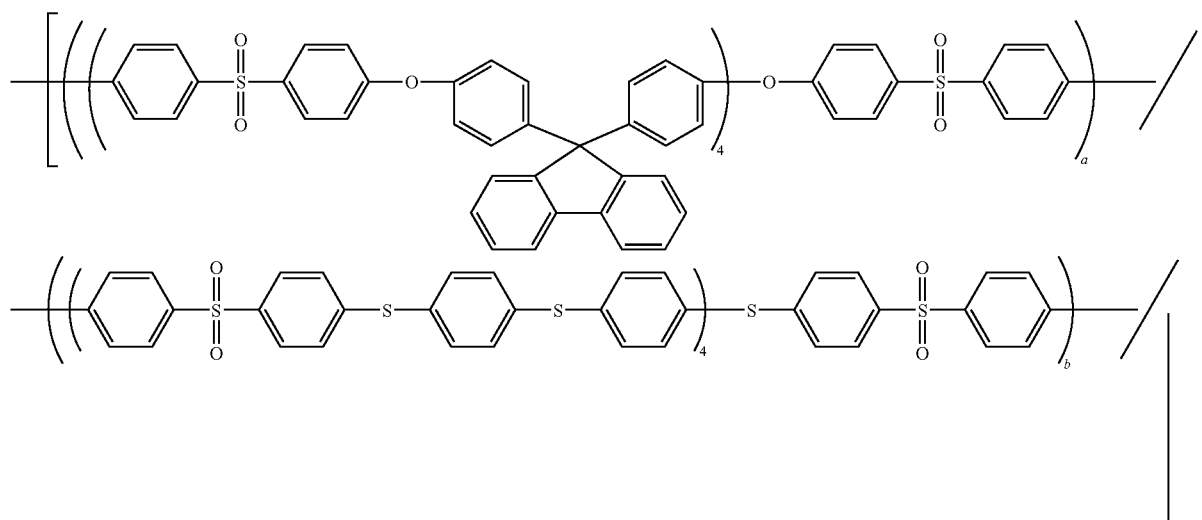
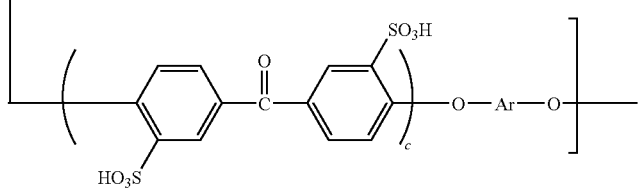

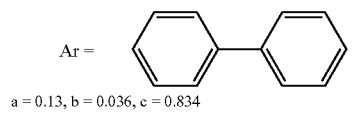

Ar = a = 0.13, b = 0.036, c = 0.834

The ion conductive polymers can be used to formulate proton exchange membranes (PEMS) catalyst coated membranes (CCMs), membrane electrode assemblies (MEAs) and fuel cells comprising the PEM membrane.

The foregoing membranes find particular utility in hydrogen fuel cells although they may be used with other fuels such as direct methanol fuel cells. Such fuel cells can be used in electronic devices, both portable and fixed, power supplies including auxiliary power units (APU's) and as locomotive power for vehicles such as automobiles, aircraft and marine vessels and APU's associated therewith.

BRIEF DESCRIPTION OF THE DRAWINGS

FIG. 1 demonstrates the conductivity versus temperature for a PEM made from the copolymer of Example 1 (a block copolymer) and a random copolymer made from the same components.

FIG. 2 depicts the fuel cell performance for using the copolymer of Example 1 under various conditions.

FIG. 3 demonstrates the effect of relative humidity on the cell voltage of fuel cells containing the copolymer of Example 1 as compared to Nafion® 112.

FIG. 4 depicts the polarization curves and power density for the MEAs made in Examples 22, 23 and 24. MEA testing conditions: 6 mg/cm² Pt—Ru in anode, 4 mg/cm² Pt in cathode, 60° C. cell temperature, 2.5 stoichiometric air flow, 1M methanol fuel.

FIG. 5 depicts the polarization curves and power density for MEAs 23 and 24. MEA testing conditions: 6 mg/cm2 Pt—Ru in anode, 4 mg/cm2 Pt in cathode, 60° C. cell temperature, 2.5 stoichiometric air flow, 1M methanol fuel.

FIG. 6 depicts polarization curves and power densities for MEAs from Example. MEA testing conditions: 6 mg/cm2 Pt—Ru in anode, 4 mg/cm2 Pt in cathode, 2.5 stoichiometric air flow, 1M methanol fuel.

DETAILED DESCRIPTION OF THE INVENTION

In one aspect, the invention provides ion conductive copolymers comprising (1) first oligomers, (2) optionally, second oligomers, (3) ion conductive monomers and (4) linking monomers. The oligomers preferably are hydrophobic and together with ion conducting monomers are randomly dispersed between linking monomers. When a single hydrophobic oligomer and ion conducting monomer are randomly dispersed in a polymer backbone, it is preferred in some embodiments that when SBisK is the ion conducting monomer that BisK is not used in combination with it to form the copolymer.

In another aspect, one of the first or second oligomer is a hard polymer relative to the other. Generally, the relative hardness or softness of one polymer versus another can be determined by comparing the glass transition temperatures for each of the first and second oligomers. A higher glass transition temperature indicates that the oligomer is harder than the one used for comparison. A determination of whether a particular monomer is harder or softer than another can be made comparing the glass transition temperature of homomonomers. Alternatively, the first monomer and third monomer in the first and second oligomers are the same allowing monomers 2 and 4 to be varied so as to compare the relative hardness of one versus the other.

Uses of such polymeric materials include the formation of polymer electrolyte membranes (PEMs), catalyst coated membranes (CCM's) and membrane electrolyte assemblies (MEA's) which may be used in fuel cells and the like.

In a preferred embodiment, the ion conductive copolymer comprises a first oligomer comprising first and second comonomers, a second oligomer comprising third and fourth comonomers (at least one of which is different from one of the comonomers of the first oligomer) and at least one monomer comprising an ion conducting group. Each of the oligomers, the ion conducting monomer and a linking monomer form the ion conductive copolymer. Some of the ion conductive monomers comprise an ion conducting group that facilitates the transport of ions such as H⁺ within and through the ion conducting copolymer.

General methods for the preparation of ion conducting copolymers are as follows. The methods include the steps of combining a first comonomer with a second comonomer to form a first oligomer and separately combining a third and fourth comonomer to form a second oligomer. The first and third comonomer have at least two leaving groups and the second and fourth comonomers have at least two displacing groups. In one aspect, the first and third comonomers are in a molar excess relative to the first comonomer, thereby forming first and second oligomers with leaving groups on the end of the first and second oligomer. The ion conductive monomer preferably also has two leaving groups. The linking monomer has at least two displacing groups.

The term "leaving group" is intended to include those functional moieties that can be displaced by a nucleophilic moiety found, typically, in another monomer. Leaving groups are well recognized in the art and include, for example, halides (chloride, fluoride, iodide, bromide), tosyl, mesyl, etc. In certain embodiments, the monomer has at least two leaving groups, which are "para" to each other with respect to the aromatic monomer to which they are attached.

The term "displacing group" is intended to include those functional moieties that can act typically as nucleophiles, thereby displacing a leaving group from a suitable monomer. The result is that the monomer to which the displacing group is attached becomes attached, generally covalently, to the monomer to which the leaving group was associated with. The displacing group becomes $R_1$ and $R_2$ as set forth above. An example of this is the displacement of fluoride groups from aromatic monomers by phenoxide, alkoxide or sulfide ions associated with aromatic monomers.

An example of the synthesis of a first and a second oligomer is as follows where LG is a leaving group and DG a displacement group.

The first oligomer is made by combining:

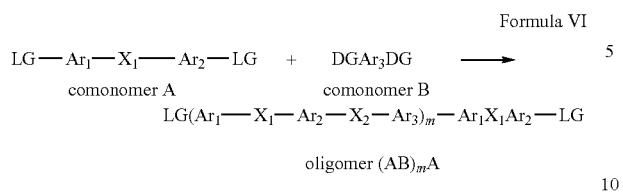

Formula VI when comonomer A is in excess
The second oligomer is similarly made:

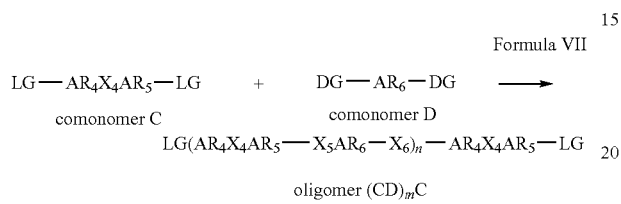

Formula VII when comonomer C is in excess.

First oligomer I, second oligomer II and an ion conducting monomer with two leaving groups and a linking monomer with two displacement groups are combined in a reaction vessel to form the ion conducting copolymer. Alternatively, the leaving groups and displacement groups can be exchanged. In either of these approaches, the copolymers can be represented by formula I:

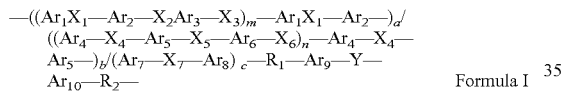

Formula I where $Ar_1$, $Ar_2$ $Ar_4$, $Ar_5$, $Ar_7$, $Ar_8$, $Ar_9$ and $Ar_{10}$ are independently phenyl, substituted phenyl napthyl, terphenyl, aryl nitrile, substituted aryl nitrile, and $Ar_7$ and/or $Ar_8$ further comprise an ion conducting group, $X_1$ and $X_4$ are independently —C(O)— or —S(O)$_2$, $X_2$, $X_3$, $X_5$ and $X_6$ are independently —O— or —S—; $X_7$ is a bond, —C(O)— or —S(O)$_2$—.

$Ar_3$ and $Ar_6$ are the same or different from each other and are

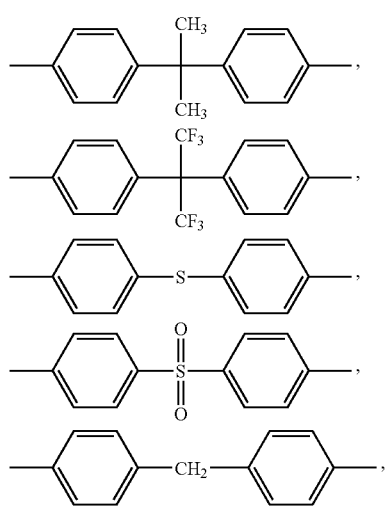

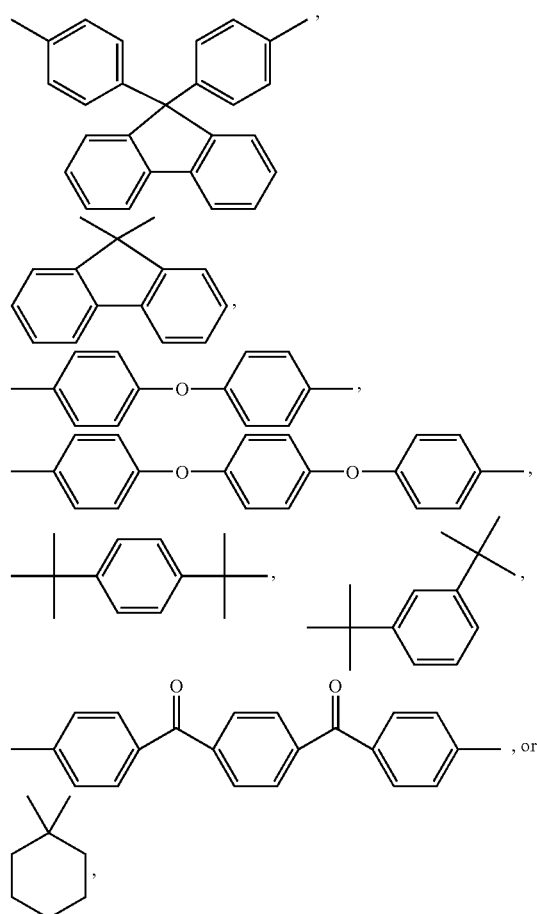

wherein the ion conductive group comprises —SO$_3$H, —COOH, —HPO$_3$H or —SO$_2$NH—SO$_2$—RF where RF is a perfluorinated hydrocarbon having 1-20 carbon atoms and said ion conducting group are pendant to the copolymer backbone;

$R_1$ and $R_2$ are independently —O—, or —S— wherein a, b and c are independently between 0.01 and 0.98 and a+b+c=1, wherein m is between 1 and 12, n is between 1 and 12.

and wherein Y is a bond, —C(O)—, or —S(O$_2$) and $Rr_{10}$ may be present or absent when Y is a bond.

In a preferred embodiment $Ar_3$ and $Ar_6$ are different from each other.

It is to be understood that the different oligomers and ion conducting monomer may combine head or tail to the linking monomer thus introducing another level of randomness in the polymer so formed.

In these and other formulas, m and n are independently 1-12, more preferably 1-10, and more preferably 2-8, and most preferably 3-6. In a particularly preferred embodiment, m and n=4. In some embodiments of this or other formulas herein at least one of m or n is 2. In others, m and n are at least 2.

In some embodiments, when SBisK is used as the ion conducting monomer, BisK is not used in combination with SBisK.

The mole fraction of the various components as defined by a, b and c are as follows. a is preferably between 0.05-0.4, more preferably between 0.05-0.25, and most preferably between 0.05 and 0.15. b is preferably between 0.01-0.04, more preferably between 0.05 and 0.3, and most preferably between 0.05 and 0.2. c is preferably between 0.2-0.94, and more preferably between 0.5 and 0.94.

The mole percent of ion conducting groups in the ion conducting copolymer is calculated as follows: c divided by a(n+1)+b(m+1)+c. In using this formula, the mole percent of a monomer containing a single ion conducting group is preferably between 30 and 70%, or more preferably between 40 and 60%, and most preferably between 45 and 55%. When more than one conducting group is contained within the ion conducting monomer, such percentages are multiplied by the total number of ion conducting groups per monomer. Thus, in the case of a monomer comprising two sulfonic acid groups, the preferred sulfonation is 60 to 140%, more preferably 80 to 120%, and most preferably 90 to 110%. Alternatively, the amount of ion conducting group can be measured by the ion exchange capacity (IEC). By way of comparison, Nafion® typically has a ion exchange capacity of 0.9 meq/gm. In the present invention, it is preferred that the IEC be between 0.9 and 3.0 meq per gram, more preferably between 1.0 and 2.5 meq per gram, and most preferably between 1.6 and 2.2 meq per gram.

The foregoing ranges can be readily adapted for use in defining other formulas contained herein.

In an alternative embodiment, comonomer II and comonomer IV are in excess and produce oligomer IA and IIA as follows:

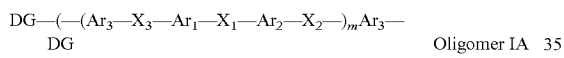
Oligomer IA

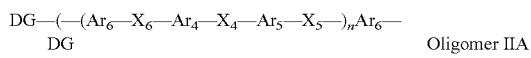
Oligomer IIA

When oligomers IA and IIA are used in combination with an ion conducting monomer comprising two displacement groups and a linking monomer comprising two leaving groups, the copolymer so produced can be represented by formula V:

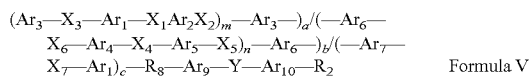
Formula V wherein each of the components are as previously described.

In another embodiment, the oligomers have different hardness as compared to each other. Formula VI is an example of such a situation:

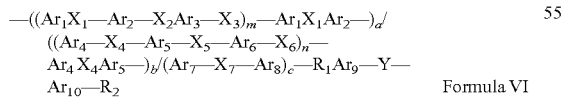
Formula VI where $Ar_1$, $Ar_2$, $Ar_4$, $Ar_5$, $Ar_7$, $Ar_8$, $Ar_9$ and $Ar_{10}$ are independently phenyl, substituted phenyl napthyl, terphenyl, aryl nitrile, substituted aryl nitrile, and $Ar_7$ and/or $Ar_8$ further comprise an ion conducting group, $X_1$ and $X_4$ are independently —C(O)— or —S(O)$_2$, $X_2$, $X_3$, $X_5$ and $X_6$ are independently —O— or —S—; $X_7$ is a bond, —C(O)— or S(O)$_2$—.

The $Ar_3$ monomers are the same or different from each other and are

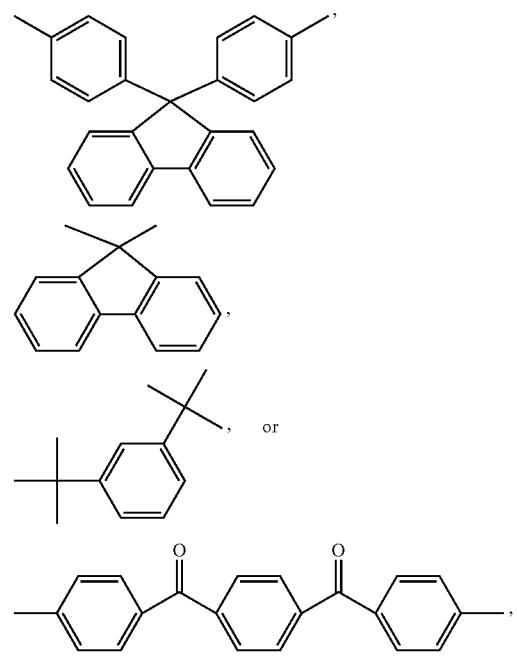

where the $Ar_6$ monomers are the same or different from each other and are

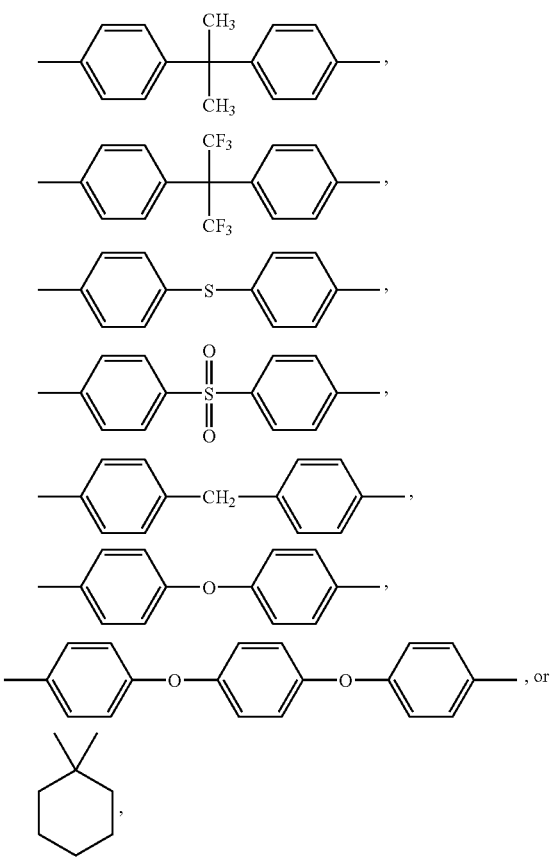

wherein the ion conductive group comprises —SO$_3$H, —COOH, —HPO$_3$H or —SO$_2$NH—SO$_2$—RF where RF is a perfluorinated hydrocarbon having 1-20 carbon atoms and said ion conducting group are pendant to the copolymer backbone;

R$_1$ and R$_2$ are independently —O— or —S—.

wherein a, b and c are independently between 0.01 and 0.98 and a+b+c=1, wherein m is between 1 and 10, n is between 1 and 10, and wherein Y is a bond, —C(O)—, or —S(O$_2$)—, and Ar$_{10}$ may be present or absent when Y is a bond.

Similarly, Formula V can be modified such that Ar$_3$ and Ar$_6$ are selected from the aromatic groups as set forth in Formula VI.

The preparation of the disclosed first and second oligomer and choice of ion conducting and linking monomer provide flexibility in the formulation of the ion conductive copolymer. Selected first and second oligomers and monomers (both ion conductive and linking) can be combined in defined ratios to provide copolymers having a variety of physical and chemical properties.

A particularly preferred embodiment is:

Formula II

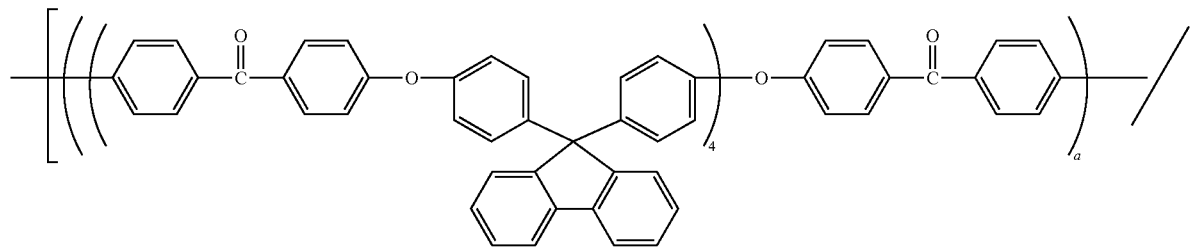

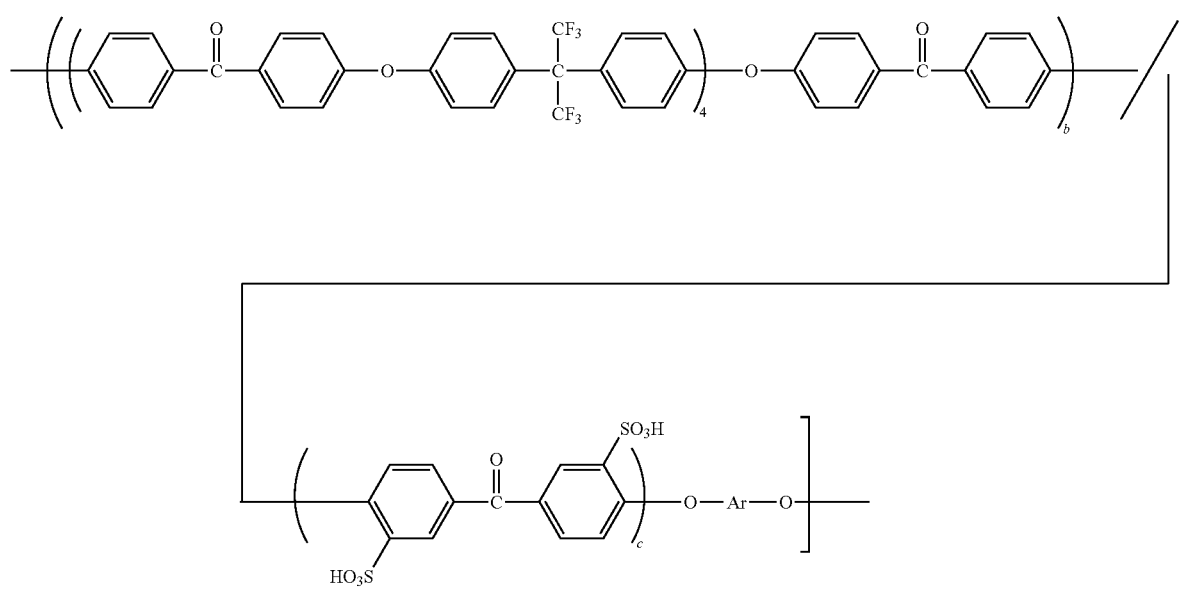

wherein Ar is:

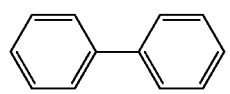 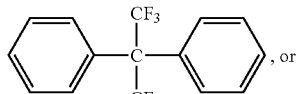, or 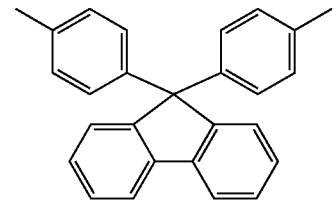

wherein a is between 0.05 and 0.2, b is between 0.01 and 0.2 and c is between 0.5 and 0.95. In a preferred embodiment, a=0.13, b=0.036 and c=0.83.

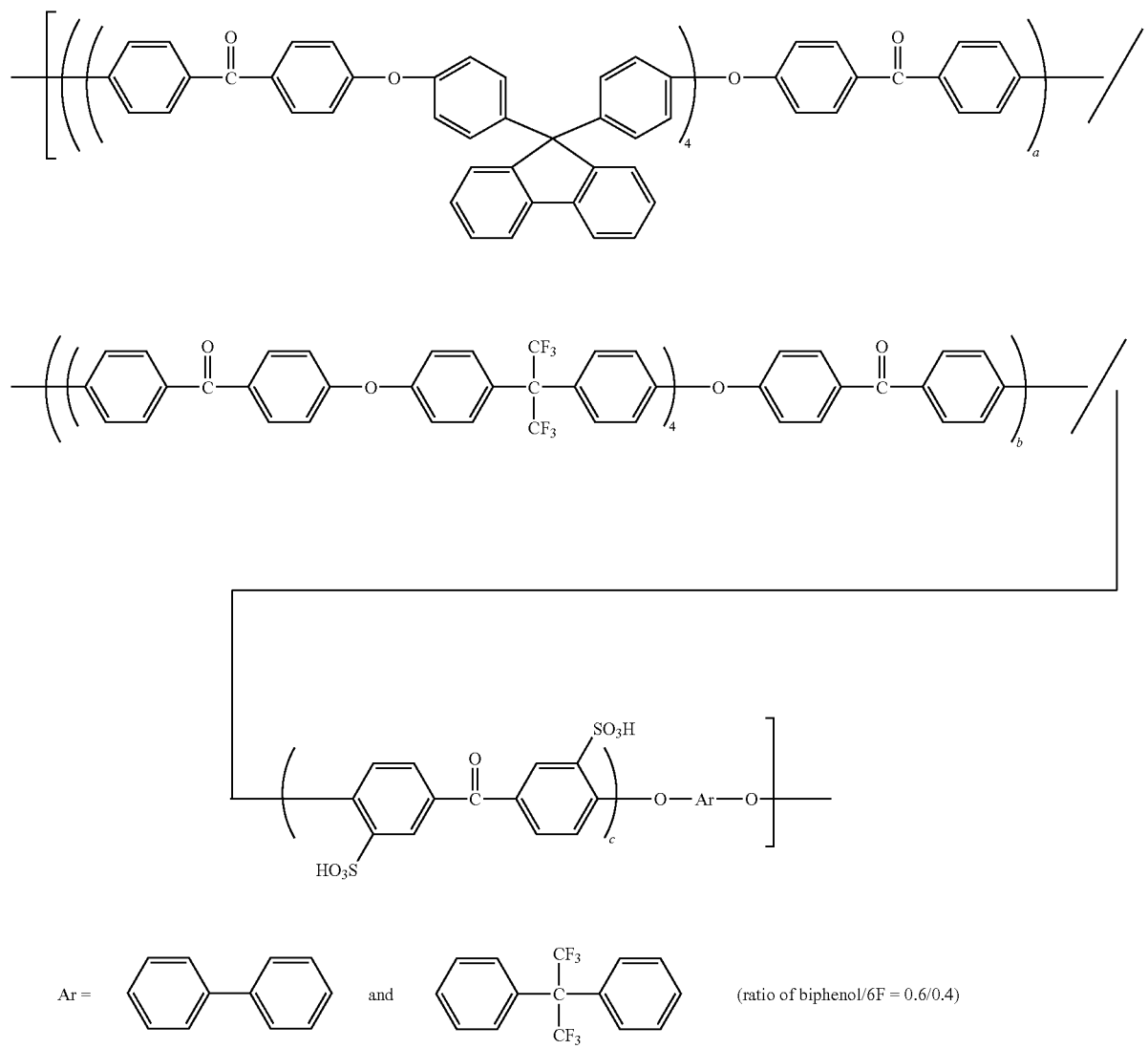
Another preferred embodiment is the copolymer of formula IIC.
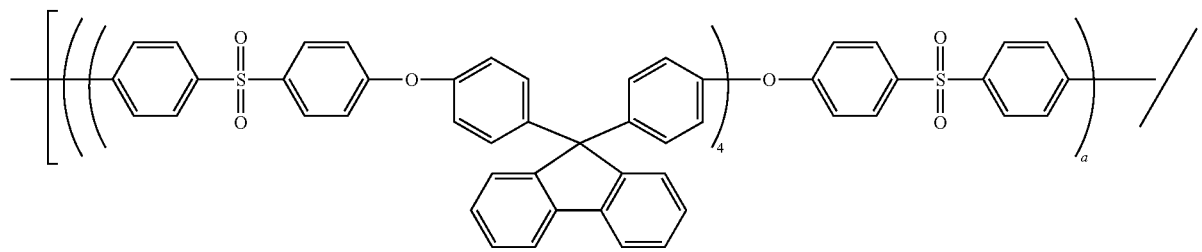

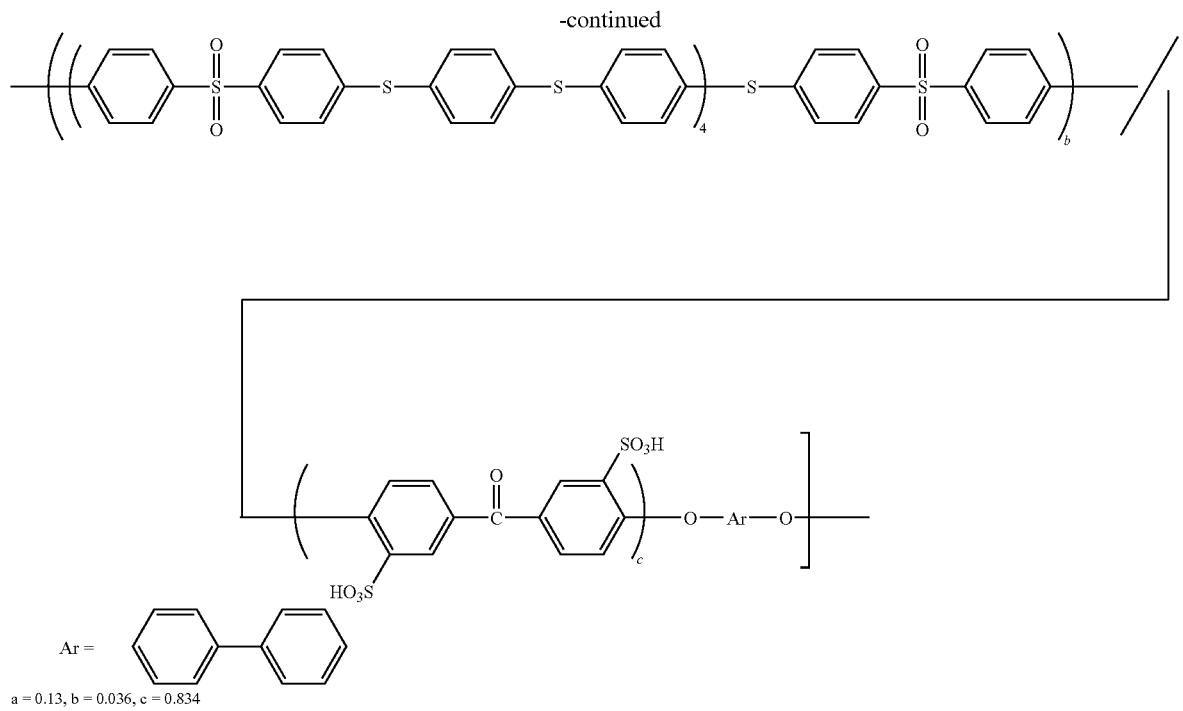

a = 0.13, b = 0.036, c = 0.834

In alternate embodiments, one oligomer is used rather than two or more different oligomers. Where this is the case in some embodiments, it is preferred when SBisK is the only ion conducting monomer that the BisK monomer is not used. In another embodiment, where a single oligomer is used, the copolymer is other than that set forth in Examples 63-116 herein.

Polymer membranes may be fabricated by solution casting of the ion conductive copolymer. Alternatively, the polymer membrane may be fabricated by solution casting the ion conducting polymer the blend of the acid and basic polymer.

When cast into a membrane for use in a fuel cell, it is preferred that the membrane thickness be between 0.1 to 10 mils, more preferably between 1 and 6 mils, most preferably between 1.5 and 2.5 mils, and it can be coated over polymer substrate As used herein, a membrane is permeable to protons if the proton flux is greater than approximately 0.005 S/cm, more preferably greater than 0.01 S/cm, most preferably greater than 0.02 S/cm.

As used herein, a membrane is substantially impermeable to methanol if the methanol transport across a membrane having a given thickness is less than the transfer of methanol across a Nafion® membrane of the same thickness. In preferred embodiments the permeability of methanol is preferably 50% less than that of a Nafion® membrane, more preferably 75% less and most preferably greater than 80% less as compared to the Nafion® membrane.

After the ion conducting copolymer has been formed into a membrane, it may be used to produce a catalyst coated membrane (CCM). As used herein, a CCM comprises a PEM when at least one side and preferably both of the opposing sides of the PEM are partially or completely coated with catalyst. The catalyst is preferable a layer made of catalyst and ionomer. Preferred catalysts are Pt and Pt—Ru. Preferred ionomers include Nafion® and other ion conductive polymers. In general, anode and cathode catalysts are applied onto the membrane by well established standard techniques. For direct methanol fuel cells, platinum/ruthenium catalyst is typically used on the anode side while platinum catalyst is applied on the cathode side. For hydrogen/air or hydrogen/oxygen fuel cells platinum or platinum/ruthenium is generally applied on the anode side, and platinum is applied on the cathode side. Catalysts may be optionally supported on carbon. The catalyst is initially dispersed in a small amount of water (about 100 mg of catalyst in 1 g of water). To this dispersion a 5% ionomer solution in water/alcohol is added (0.25-0.75 g). The resulting dispersion may be directly painted onto the polymer membrane. Alternatively, isopropanol (1-3 g) is added and the dispersion is directly sprayed onto the membrane. The catalyst may also be applied onto the membrane by decal transfer, as described in the open literature (*Electrochimica Acta*, 40: 297 (1995)).

The CCM is used to make MEA's. As used herein, an MEA refers to an ion conducting polymer membrane made from a CCM according to the invention in combination with anode and cathode electrodes positioned to be in electrical contact with the catalyst layer of the CCM.

The electrodes are in electrical contact with the catalyst layer, either directly or indirectly, when they are capable of completing an electrical circuit which includes the CCM and a load to which the fuel cell current is supplied. More particularly, a first catalyst is electrocatalytically associated with the anode side of the PEM so as to facilitate the oxidation of hydrogen or organic fuel. Such oxidation generally results in the formation of protons, electrons and, in the case of organic fuels, carbon dioxide and water. Since the membrane is substantially impermeable to molecular hydrogen and organic fuels such as methanol, as well as carbon dioxide, such components remain on the anodic side of the membrane. Electrons formed from the electrocatalytic reaction are transmitted from the cathode to the load and then to the anode.

Balancing this direct electron current is the transfer of an equivalent number of protons across the membrane to the anodic compartment. There an electrocatalytic reduction of oxygen in the presence of the transmitted protons occurs to form water.

In one embodiment, air is the source of oxygen. In another embodiment, oxygen-enriched air is used.

The membrane electrode assembly is generally used to divide a fuel cell into anodic and cathodic compartments. In such fuel cell systems, a fuel such as hydrogen gas or an organic fuel such as methanol is added to the anodic compartment while an oxidant such as oxygen or ambient air is allowed to enter the cathodic compartment. Depending upon the particular use of a fuel cell, a number of cells can be combined to achieve appropriate voltage and power output. Such applications include electrical power sources for residential, industrial, commercial power systems and for use in locomotive power such as in automobiles. Other uses to which the invention finds particular use includes the use of fuel cells in portable electronic devices such as cell phones and other telecommunication devices, video and audio consumer electronics equipment, computer laptops, computer notebooks, personal digital assistants and other computing devices, GPS devices and the like. In addition, the fuel cells may be stacked to increase voltage and current capacity for use in high power applications such as industrial and residential sewer services or used to provide locomotion to vehicles.

Such fuel cell structures include those disclosed in U.S. Pat. Nos. 6,416,895, 6,413,664, 6,106,964, 5,840,438, 5,773,160, 5,750,281, 5,547,776, 5,527,363, 5,521,018, 5,514,487, 5,482,680, 5,432,021, 5,382,478, 5,300,370, 5,252,410 and 5,230,966.

Such CCM and MEM's are generally useful in fuel cells such as those disclosed in U.S. Pat. Nos. 5,945,231, 5,773,162, 5,992,008, 5,723,229, 6,057,051, 5,976,725, 5,789,093, 4,612,261, 4,407,905, 4,629,664, 4,562,123, 4,789,917, 4,446,210, 4,390,603, 6,110,613, 6,020,083, 5,480,735, 4,851,377, 4,420,544, 5,759,712, 5,807,412, 5,670,266, 5,916,699, 5,693,434, 5,688,613, 5,688,614, each of which is expressly incorporated herein by reference.

The CCM's and MEA's of the invention may also be used in hydrogen fuel cells which are known in the art. Examples include U.S. Pat. Nos. 6,630,259; 6,617,066; 6,602,920; 6,602,627; 6,568,633; 6,544,679; 6,536,551; 6,506,510; 6,497,974, 6,321,145; 6,195,999; 5,984,235; 5,759,712; 5,509,942; and 5,458,989 each of which are expressly incorporated herein by reference.

The ion conducting polymer membranes of the invention also find use as separators in batteries. Particularly preferred batteries are lithium ion batteries.

EXAMPLES

A list of some of the monomers used in practicing the invention are set forth in Table I.

TABLE I

| | | Monomers Used | |
|---|---|---|---|
| Acronym | Full name | Molecular weight | Chemical structure |
| 1) Difluoro-end monomers | | | |
| Bis K | 4,4'-Difluorobenzophenone | 218.20 | |
| Bis $SO_2$ | 4,4'-Difluorodiphenylsulfone | 254.25 | |
| S-Bis K | 3,3'-disulfonated-4,4'-difluorobenzophone | 422.28 | |
| 2) Dihydroxy-end monomers | | | |
| Bis AF (AF or 6F) | 2,2-Bis(4-hydroxyphenyl)hexafluoropropane or 4,4'-(hexafluoroisopropylidene)diphenol | 336.24 | |
| BP | Biphenol | 186.21 | |

TABLE I-continued

| | | Monomers Used | |
|---|---|---|---|
| Acronym | Full name | Molecular weight | Chemical structure |
| Bis FL | 9,9-Bis(4-hydroxyphenyl)fluorene | 350.41 | |
| Bis Z | 4,4'-cyclohexylidenebisphenol | 268.36 | |
| Bis S | 4,4'-thiodiphenol | 218.27 | |
| 3) Dithiol-end monomers | | | |
| 35 | 4,4'-thiol bis benzene thiol | | |

This Table also provides acronyms used for the various starting monomers as well as the monomers as contained within ion conductive copolymers. Other acronyms include the following:

Acronym: R=random copolymer, Bl=block copolymer
  RK=random copolymer based on Bis K and S-BisK,
  RS=random copolymer based on BisSO$_2$ and S-BisK
  B=biphenol, AF=BisAF (6F), FL=BisFL, Z=BisZ
  BlK=Block copolymer containing BisK in its formulation
  Bl_=Block copolymer without BisK in its formulation Abbreviations include:
  IEC: Ion Exchange Capacity (meq/g), IV: Inherent viscosity (dl/g)
  CD: conductivity (S/cm)

Example 1

BL_FL4AF4—B/50, Oligomers Used: FL4+AF4

Oligomer 1 (FL4, F-end): m or n=4

In a 500 ml three necked round flask, equipped with a mechanical stirrer, a thermometer probe connected with a nitrogen inlet, and a Dean-Stark trap/condenser, 4,4'-difluorobenzophone (BisK, 34.91 g, 0.16 mol), 9,9-bis(4-hydroxyphenyl)fluorene (Bis FL, 42.05 g, 0.12 mol), and anhydrous potassium carbonate (19.9 g, 0.192 mol) were dissolved in a mixture of 220 ml of DMSO and 110 ml of Toluene. The reaction mixture was slowly stirred under a slow nitrogen stream. After heating at ~120° C. for 1 h and was raised to ~140° C. for 2 h, and finally to ~160° C. for 3 h. After cooling to ~70° C. with continuing stirring, the solution was dropped into 1 L of cooled methanol with a vigorous stirring. The precipitates were filtrated and washed with DI-water four times and dried at 80° C. overnight, and then dried at 80° C. under vacuum for 2 days. The oligomer has the following structure:

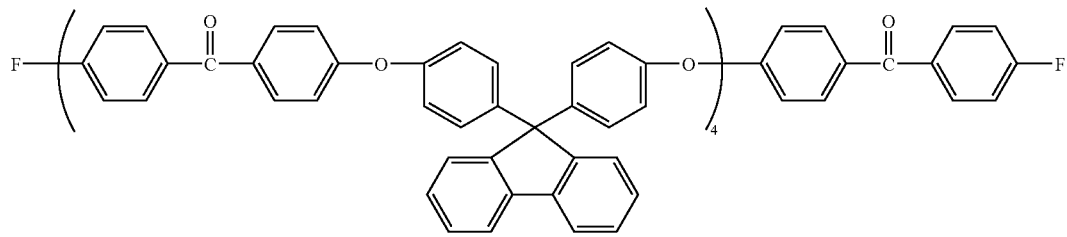

Oligomer 2 (AF4, F-end): m or n=4

This oligomer was synthesized in a similar way as described in the oligomer 1 synthesis, using following compositions: 4,4'-difluorobenzophone (BisK, 34.91 g), 4,4'-(hexafluoroisopropylidene)diphenol (Bis AF, 40.35 g), and anhydrous potassium carbonate (19.9 g) in a mixture of 220 ml of DMSO and 110 ml of Toluene. The oligomer has the following structure:

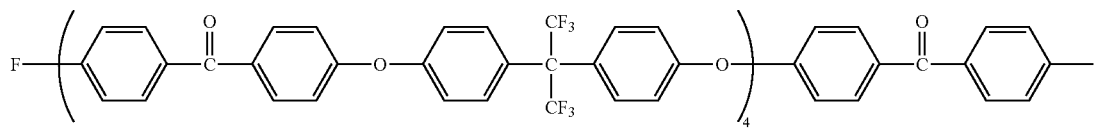

Polymerization

In a 500 ml three necked round flask, equipped with a mechanical stirrer, thermometer, nitrogen inlet and Dean-Stark trap/condenser, 3,3'-disulfonated-4,4'-difluorobenzophone (S-BisK, 17.61 g), Oligomer 1 (15.16 g), Oligomer 2 (4.10 g), biphenol (9.31 g), and anhydrous potassium carbonate (8.29 g) were dissolved in a mixture of DMSO and Toluene (about 20% solid concentration). The mixture was heated to toluene flux with stirring, keeping the temperature at 140° C. for 6 h, then increase temperature to 173-175° C. for 4 h. The reaction mixture was precipitated from methanol to get the crude product and washed with DI-water. The polymer was treated in 0.5 mol $H_2SO_4$ aqueous solution at 80° C. for 1 hour to produce the proton form of sulfonic acid group in the polymer and washed with deionized water and dried at 80° C. overnight, and then dried at 80° C. under vacuum for 2 days.

Dried polymer was dissolved in dimethylacetamide (DMAc) to make a solution (25 wt %) and cast, and dried at 80° C. to make a membrane (2.0 mil thick). The obtained membrane was treated in 1.5 mol $H_2SO_4$ aqueous solution to get rid of DMAc residue and rinsed in DI-water until no $H_2SO_4$ residue was detected, and dried at 80° C.

The polymer membrane was swollen in water at room temperature and the polymer membrane conductivity was measured by AC impedance. The dried membrane was swollen in a boiling water for 1 hour to measure water-uptake and swelling by area.

This polymer has an inherent viscosity of 1.52 dl/g in DMAc (0.25 g/dl). IEC is 1.97 meq/g. Conductivity: 0.093 S/cm (0.112 S/cm, boiled in water 1 hr), swelling by area in boiled water 1 hr: 50%, water-uptake after boiling the membrane in water 1 hr 64%

Example 2

BL_FL4 AF4—B45 Oligomers Used: FL4+AF4

This block polymer was synthesized and treated in a similar way as described in example 1: S-BisK (16.98 g), Oligomer 1 (15.86 g), Oligomer 2 (6.83 g), biphenol (9.31 g), and anhydrous potassium carbonate (8.29 g) were dissolved in a mixture of DMSO and Toluene (about 20% solid concentration).

This polymer has an inherent viscosity of 1.11 dl/g in DMAc (0.25 g/dl). IEC is 1.78 meq/g. Conductivity: 0.081 S/cm (0.099 S/cm, boiled in water 1 hr), swelling by area in boiled water 1 hr: 40%, water-uptake after boiling the membrane in water 1 hr: 57%

Example 3

BL_FL4 AF4—B/41 Oligomers Used: FL4+AF4

This block polymer was synthesized in a similar way as described in example 1: S-BisK (16.47 g), Oligomer 1 (14.0 g), Oligomer 2 (11.38 g), biphenol (9.31 g), and anhydrous potassium carbonate (8.29 g) were dissolved in a mixture of DMSO and Toluene (about 20% solid concentration).

This polymer has an inherent viscosity of 1.30 dl/g in DMAc (0.25 g/dl). IEC is 1.64 meq/g. Conductivity: 0.068 S/cm (0.092 S/cm, boiled in water 1 hr), swelling by area in boiled water 1 hr: 35%, water-uptake after boiling the membrane in water 1 hr: 52%

Example 4

BL_FL4 AF8—B/48 Oligomers Used: FL4+AF8

Oligomer 3 (AF8, F-end): m or n=8

This oligomer was synthesized in a similar way as described in the oligomer 1 synthesis: BisK (34.91 g), Bis AF (47.07 g), and anhydrous potassium carbonate (23.22 g) in a mixture of 220 ml of DMSO and 110 ml of Toluene. This structure is the same as oligomer 2 except that the AF unit is repeating 8 times rather than 4 times.

Polymerization

The block polymer was synthesized in a similar way as described in example 1: S-BisK (17.82 g), Oligomer 1 (14.0 g), Oligomer 3 (7.8 g), biphenol (9.31 g), and anhydrous potassium carbonate (8.29 g) were dissolved in a mixture of DMSO and Toluene (about 20% solid concentration).

This polymer has an inherent viscosity of 1.79 dl/g in DMAc (0.25 g/dl). IEC is 1.87 meq/g. Conductivity: 0.092

S/cm (0.100 S/cm, boiled in water 1 hr), swelling by area in boiled water 1 hr: 45%, water-uptake after boiling the membrane in water 1 hr: 63%

Example 5

(BL_FL4 AF4—B/42 Oligomers Used: FL4+AF8

This block polymer was synthesized in a similar way as described in example 1: S-BisK (17.31 g), Oligomer 1 (14.0 g), Oligomer 3 (13.0 g), biphenol (9.31 g), and anhydrous potassium carbonate (8.29 g) were dissolved in a mixture of DMSO and Toluene (about 20% solid concentration).

This polymer has an inherent viscosity of 1.73 dl/g in DMAc (0.25 g/dl). IEC is 1.65 meq/g. Conductivity: 0.074 S/cm (0.100 S/cm, boiled in water 1 hr), swelling by area in boiled water 1 hr: 38%, water-uptake after boiling the membrane in water 1 hr: 58%

Table II sets forth the properties of the copolymer made in Examples 1-5 as well as other oligomeric block copolymers.

Polymerization

This block polymer was synthesized in a similar way as described in example 1: S-BisK (17.31 g), Oligomer 1 (14.0 g), Oligomer 4 (11.14 g), biphenol (9.31 g), and anhydrous potassium carbonate (8.29 g) were dissolved in a mixture of DMSO and Toluene (about 20% solid concentration).

This polymer has an inherent viscosity of 1.36 dl/g in DMAc (0.25 g/dl). IEC is 1.71 meq/g. Conductivity: 0.072 S/cm (0.097 S/cm, boiled in water 1 hr), swelling by area in boiled water 1 hr: 41%, water-uptake after boiling the membrane in water 1 hr: 64%

Example 7

BL_FL4—B/41 Oligomer Used: FL4 Only

This block polymer was synthesized in a similar way as described in example 1: S-BisK (16.47 g), Oligomer 1 (25.66 g), biphenol (9.31 g), and anhydrous potassium carbonate (8.29 g) were dissolved in a mixture of DMSO and Toluene (about 20% solid concentration).

This polymer has an inherent viscosity of 1.54 dl/g in DMAc (0.25 g/dl). IEC is 1.63 meq/g. Conductivity: 0.061

TABLE II

Properties of Oligomeric Block Membranes

| Polymer | IEC | IV | CD(S/cm) at rt | CD (boiled) | Swelling % | Water-uptake % |
|---|---|---|---|---|---|---|
| B1K__AF4-AF/35 | 1.23 | 1.12 | 0.025 | 0.060 | 35.7 | 42.0 |
| B1K__AF10-AF/35 | 1.23 | 1.14 | 0.049 | 0.045 | 127 | 160 |
| B1K__FL4-AF/41 | 1.40 | 1.19 | 0.036 | 0.080 | 43.8 | 58.8 |
| B1K__FL4-B50AF50/42 | 1.58 | 1.45 | 0.048 | 0.088 | 43.2 | 58.3 |
| B1__FL4AF4-B/41 | 1.64 | 1.30 | 0.068 | 0.092 | 34.7 | 52.1 |
| B1__FL4-B/41 | 1.63 | 1.54 | 0.061 | 0.087 | 35.0 | 48.5 |
| B1__FL4AF8-B/42 | 1.65 | 1.73 | 0.074 | 0.100 | 37.5 | 58.3 |
| B1__FL4S8-B/42 | 1.71 | 1.36 | 0.072 | 0.097 | 41.1 | 63.7 |
| B1__FL4AF4-B/45 | 1.78 | 1.11 | 0.081 | 0.099 | 39.8 | 57.2 |
| B1K__FL4-AF/41 | 1.41 | 1.11 | 0.033 | 0.075 | 51.3 | 62.5 |
| B1__FL4AF4-B/50 | 1.97 | 1.52 | 0.093 | 0.112 | 50.2 | 63.9 |
| B1__FL4AF8-B/48 | 1.87 | 1.79 | 0.092 | 0.100 | 62.8 | 45.2 |
| B1__AF8-B/45 | 1.78 | 1.21 | 0.119 | 0.103 | 80.9 | 36.3 |

Example 6

BL_FL4 S8—B/42 Oligomers Used: FL4+S8)

Oligomer 4 (S8, F-end): m or n=8

This oligomer was synthesized in a similar way as described in the oligomer 1 synthesis, using following compositions: 4,4'-difluorodiphenylsulfone (Bis SO$_2$, 40.68 g), 4,4'-thiodiphenol (Bis S, 30.56 g), and anhydrous potassium carbonate (23.22 g) in a mixture of 220 ml of DMSO and 110 ml of Toluene. S8 has the following structure:

S/cm (0.087 S/cm, boiled in water 1 hr), swelling by area in boiled water 1 hr: 35%, water-uptake after boiling the membrane in water 1 hr: 49%

Example 8

BLK_FL4—B50 AF50/42 Oligomer Used: FL4 Only

This block polymer was synthesized in a similar way as described in example 1: Bis K (2.75 g), S-BisK (13.26 g), Oligomer 1 (14.0 g), biphenol (4.66 g), Bis AF (8.41 g), and

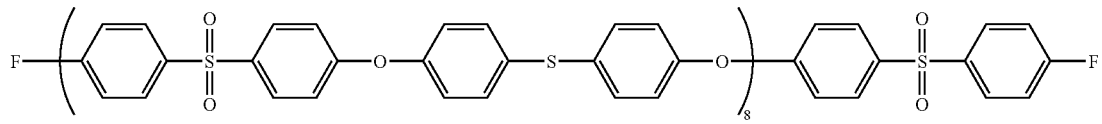

anhydrous potassium carbonate (8.29 g) were dissolved in a mixture of DMSO and Toluene (about 20% solid concentration).

This polymer has an inherent viscosity of 1.45 dl/g in DMAc (0.25 g/dl). IEC is 1.58 meq/g. Conductivity: 0.048 S/cm (0.088 S/cm, boiled in water 1 hr), swelling by area in boiled water 1 hr: 43%, water-uptake after boiling the membrane in water 1 hr: 58%

Example 9

BLK_FL4—AF/41 Oligomer used: FL4 Only

This block polymer was synthesized in a similar way as described in example 1: Bis K (2.4 g), S-BisK (13.51 g), Oligomer 1 (16.33 g), Bis AF (16.81 g), and anhydrous potassium carbonate (8.29 g) were dissolved in a mixture of DMSO and Toluene (about 20% solid concentration).

This polymer has an inherent viscosity of 1.19 dl/g in DMAc (0.25 g/dl). IEC is 1.40 meq/g. Conductivity: 0.036 S/cm (0.080 S/cm, boiled in water 1 hr), swelling by area in boiled water 1 hr: 44%, water-uptake after boiling the membrane in water 1 hr: 59%

Example 10

B_AF8—B/45 Oligomer Used: AF8 (Oligomer 3) Only

This block polymer was synthesized in a similar way as described in example 1: S-BisK (18.62 g), Oligomer 3 (25.57 g), biphenol (9.31 g), and anhydrous potassium carbonate (8.29 g) were dissolved in a mixture of DMSO and Toluene (about 20% solid concentration).

This polymer has an inherent viscosity of 1.21 dl/g in DMAc (0.25 g/dl). IEC is 1.78 meq/g. Conductivity: 0.119 S/cm (0.103 S/cm, boiled in water 1 hr), swelling by area in boiled water 1 hr: 36%, water-uptake after boiling the membrane in water 1 hr: 81%

Example 11

BLK_AFLO—AF/35 Oligomers Used: AFLO Only

Oligomer 5 (AF10, F-end): DP=10

This oligomer was synthesized in a similar way as described in the oligomer 1 synthesis, using following compositions: BisK (34.91 g), Bis AF (48.42 g), and anhydrous potassium carbonate (23.88 g) in a mixture of 220 ml of DMSO and 110 ml of Toluene.

Polymerization

This block polymer was synthesized in a similar way as described in example 1: B isK (2.34 g), S-BisK (14.57 g), Oligomer 5 (25.74 g), BisAF (16.81 g), and anhydrous potassium carbonate (8.29 g) were dissolved in a mixture of DMSO and Toluene (about 20% solid concentration).

This polymer has an inherent viscosity of 1.14 dl/g in DMAc (0.25 g/dl). IEC is 1.23 meq/g. Conductivity: 0.049 S/cm (0.045 S/cm, boiled in water 1 hr), swelling by area in boiled water 1 hr: 127%, water-uptake after boiling the membrane in water 1 hr: 160%

The membrane conductivity: 0.060 S/cm, Swelling after boiled: 68% by area, water up-take:84%

Example 12

Synthesis of Partial Block Polymer with Non-Sulfonated Hydrophobic Segment

Fluorine end group oligomer (difluorophenyl sulfone/4,4'-thiolbisbenezenesulfide) preparation (segment size n=4)

In a 250 ml three necked round flask, equipped with a mechanical stirrer, thermometer, nitrogen inlet and Dean-Stark trap/condenser, 4,4'-Thiolbisbenezenethiol (15.0246 g), difluorophenyl sulfone (20.34 g), anhydrous potassium carbonate (11 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80C oven for one day and 75C vacuum oven for 2 days.

Polymerization

In a 250 ml three necked round flask, equipped with a mechanical stirrer, thermometer, nitrogen inlet and Dean-Stark trap/condenser, 4,4'-Thiolbisbenezenethiol (12.5205 g), difluorophenyl sulfone (6.102 g), sulfonated difluorophenyl sulfone (901664 g), oligomer (12.672 g, n=4, fluorine end of difluorophenyl sulfone/4,4'-thiolbisbenezenesulfide composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

The membrane conductivity: 0.076 S/cm, Swelling after boiled: 50% by area, water up-take:41%

Example 13

F-ended Oligomer 1: DP=4

In a 500 mL three necked round flask, equipped with a mechanical stirrer, a thermometer probe connected with a nitrogen inlet, and a Dean-Stark trap/condenser, 4,4'-difluorobenzophone (BisK, 34.91 g, 0.16 mol), 9,9-bis(4-hydroxyphenyl)fluorene (42.05 g, 0.12 mol), and anhydrous potassium carbonate (25.87 g, 0.187 mol), 220 mL of DMSO and 110 mL of Toluene. The reaction mixture was slowly stirred under a slow nitrogen stream. After heating at ~85° C. for 1 h and at ~120° C. for 1 h, the reaction temperature was raised to ~140° C. for 3 h, and finally to ~170° C. for 2 h. After cooling to ~70° C. with continuing stirring, the solution was dropped into 1 L of methanol with a vigorous stirring. The precipitates were filtrated and washed with de-ionized water four times and dried at 80° C. overnight, and then dried at 80° C. under vacuum for 2 days.

A block copolymer was synthesized in a similar way as described in the oligomer 1 synthesis, using following compositions: 4,4'-difluorobenzophone (BisK, 6.49 g), 3,3'-disulfonated-4,4'-difluorobenzophone (SBisK, 13.39 g), Oligomer 7 (18.29 g), 1,1-Bis(4-hydroxyphenyl)cyclohexane (BisZ, 26.28 g), and anhydrous potassium carbonate (12.51 g), 216 mL of DMSO and 108 mL of Toluene. The dried polymer was converted into acid form by stirring in hot $H_2SO_4$ (0.5 M) solution for one hour, followed by de-ionized water washing, and dried.

Example 14

This block polymer was synthesized in a similar way as described in Example 13 synthesis, using following compositions: BisK (6.84 g), SBisK (16.76 g), Oligomer 7 (20.90 g), BisZ (21.47 g), and anhydrous potassium carbonate (14.37 g).

Example 15

This block polymer was synthesized in a similar way as described in Example 13 synthesis, using following compositions: BisK (5.72 g), SBisK (17.04 g), Oligomer 7 (19.59 g), BisZ (20.12 g), and anhydrous potassium carbonate (13.48 g).

Example 16

This block polymer was synthesized in a similar way as described in Example 13 synthesis, using following compositions: BisK (5.27 g), SBisK (19.80 g), Oligomer 7 (20.90 g), BisZ (21.47 g), and anhydrous potassium carbonate (14.37 g).

Example 17

This block polymer was synthesized in a similar way as described in Example 13 synthesis, using following compositions: BisK (3.92 g), SBisK (13.48 g), Oligomer 7 (23.51 g), BisZ (16.10 g), and anhydrous potassium carbonate (10.78 g).

Example 18

This block polymer was synthesized in a similar way as described in Example 13 synthesis, using following compositions: BisK (2.16 g), SBisK (15.48 g), Oligomer 7 (31.35 g), BisZ (16.10 g), and anhydrous potassium carbonate (10.78 g).

Example 19

This block polymer was synthesized in a similar way as described in Example 13 synthesis, using following compositions: BisK (8.52 g), SBisK (13.51 g), Oligomer 7 (20.90 g), 2,2'-Biphenol (14.89 g), and anhydrous potassium carbonate (14.37 g).

Example 20

This block polymer was synthesized in a similar way as described in Example 13 synthesis, using following compositions: BisK (6.97 g), SBisK (12.00 g), Oligomer 7 (17.76 g), 2,2'-Biphenol (12.66 g), and anhydrous potassium carbonate (12.22 g).

Example 21

This block polymer was synthesized in a similar way as described in Example 13 synthesis, using following compositions: BisK (7.84 g), SBisK (14.83 g), Oligomer 7 (20.90 g), 2,2'-Biphenol (14.89 g), and anhydrous potassium carbonate (14.37 g).

Example 22

This block polymer was synthesized in a similar way as described in Example 13 synthesis, using following compositions: BisK (5.41 g), SBisK (14.13 g), Oligomer 7 (27.43 g), 2,2'-Biphenol (13.03 g), and anhydrous potassium carbonate (12.58 g). MEA 10 contains this block copolymer.

Example 23

This block polymer was synthesized in a similar way as described in Example 13 synthesis, using following compositions: BisK (4.35 g), SBisK (12.67 g), Oligomer 7 (23.51 g), 2,2'-Biphenol (11.17 g), and anhydrous potassium carbonate (10.78 g). MEA 11 contains this block copolymer.

Example 24

This block polymer was synthesized in a similar way as described in Example 13 synthesis, using following compositions: BisK (4.73 g), SBisK (15.43 g), Oligomer 7 (27.43 g), 2,2'-Biphenol (13.03 g), and anhydrous potassium carbonate (12.58 g). MEA 12 contains this block copolymer.

Example 25

This block polymer was synthesized in a similar way as described in Example 13 synthesis, using following compositions: BisK (2.94 g), SBisK (12.33 g), Oligomer 7 (28.73 g), 2,2'-Biphenol (10.24 g), and anhydrous potassium carbonate (9.88 g).

Example 26

This block polymer was synthesized in a similar way as described in Example 13 synthesis, using following compositions: BisK (2.86 g), SBisK (14.11 g), Oligomer 7 (31.35 g), 2,2'-Biphenol (11.17 g), and anhydrous potassium carbonate (10.78 g).

TABLE 1

Ex-situ Data Summary for Block Polymer

| Membrane | IEC (meq/g) | $[\eta]_{25}$ (dL/g) | SW (%) | σ r.t./boiled (S/cm) | Methanol crossover r.t./boiled (mg · mil/ cc · min · cm$^2$) | Water uptake (%, w/w) | λ (H$_2$O/ H$^+$) |
|---|---|---|---|---|---|---|---|
| Example 13 | 1.20 | 0.58 | 32 | NA/0.034 | NA/0.018 | 33 | 15 |
| Example 14 | 1.30 | 1.64 | 35 | 0.020/0.037 | NA/0.016 | 26 | 11 |
| Example 15 | 1.40 | 0.72 | 56 | 0.024/0.053 | 0.010/0.017 | 40 | 16 |
| Example 16 | 1.50 | 0.99 | 59 | 0.041/0.058 | NA/0.044 | 43 | 16 |
| Example 17 | 1.20 | 1.00 | 27 | 0.021/0.035 | 0.003/0.010 | 25 | 12 |
| Example 18 | 1.20 | 1.44 | 25 | 0.023/0.035 | NA/0.011 | 25 | 12 |

Example 27

This block polymer was synthesized in a similar way as described in Example 13 synthesis, using following compositions: BisK (2.54 g), SBisK (14.74 g), Oligomer 7 (31.35 g), 2,2'-Biphenol (11.17 g), and anhydrous potassium carbonate (10.78 g).

Example 28

This block polymer was synthesized in a similar way as described in Example 13 synthesis, using following compositions: BisK (1.80 g), SBisK (12.90 g), Oligomer 7 (26.12 g). 2,2'-Biphenol (9.31 g), and anhydrous potassium carbonate (8.98 g).

Example 29

This block polymer was synthesized in a similar way as described in Example 13 synthesis, using following compositions: BisK (1.55 g), SBisK (13.39 g), Oligomer 7 (26.12 g), 2,2'-Biphenol (9.31 g), and anhydrous potassium carbonate (8.98 g).

Example 30

This block polymer was synthesized in a similar way as described in Example 13 synthesis, using following compositions: BisK (1.25 g), SBisK (13.96 g), Oligomer 7 (26.12 g), 2,2'-Biphenol (9.31 g), and anhydrous potassium carbonate (8.98 g).

TABLE 2

Ex-Situ Data Summary for Block Polymers

| Membrane | IEC (meq/g) | $[\eta]_{25}$ (dL/g) | SW (%) | $\sigma$ r.t./boiled (S/cm) | Methanol crossover r.t./boiled (mg·mil/ cc·min·cm$^2$) | Water uptake (%, w/w) | $\lambda$ ($H_2O$/ $H^+$) |
|---|---|---|---|---|---|---|---|
| Example 19 | 1.20 | 1.74 | 16 | 0.027/0.039 | 0.023/0.024 | 22 | 10 |
| Example 20 | 1.25 | 2.09 | 18 | 0.030/0.039 | 0.012/0.015 | 24 | 11 |
| Example 21 | 1.30 | 2.14 | 24 | 0.033/0.046 | 0.014/0.027 | 27 | 12 |
| Example 22 | 1.20 | 1.48 | 23 | 0.026/0.037 | 0.013/NA | 20 | 9 |
| Example 23 | 1.25 | 1.59 | 24 | 0.030/0.042 | 0.014/0.024 | 25 | 11 |
| Example 24 | 1.30 | 2.08 | 21 | 0.034/0.044 | 0.013/0.023 | 27 | 12 |
| Example 25 | 1.15 | 1.11 | 24 | 0.026/0.037 | NA | 24 | 12 |
| Example 26 | 1.20 | 1.67 | 22 | 0.031/0.040 | NA/0.009 | 21 | 10 |
| Example 27 | 1.25 | 1.45 | 25 | 0.034/0.043 | NA/0.013 | 24 | 11 |
| Example 28 | 1.30 | 1.46 | 24 | 0.038/0.049 | 0.011/0.027 | 27 | 12 |
| Example 29 | 1.35 | 1.80 | 26 | 0.042/0.058 | 0.016/0.036 | 27 | 11 |
| Example 30 | 1.40 | 1.30 | 28 | 0.041/0.057 | 0.017/0.035 | 29 | 12 |

TABLE 3

In-Situ Data Summary for Block Polymers

| Membrane | Thickness ($\mu$) | Power density at 0.4 V (mW/cm$^2$) | Methanol crossover (mA/cm$^2$) | HFR (Ohm·cm$^2$) |
|---|---|---|---|---|
| Example 19 | 44 | 106 | 46 | 0.20 |
| Example 20 | 56 | 111 | 39 | 0.22 |
| Example 21 | 56 | 112 | 44 | 0.17 |
| Example 22 | 45 | 103 | 40 | 0.18 |
| Example 23 | 57 | 120 | 45 | 0.18 |
| Example 24 | 48 | 120 | 58 | 0.14 |
| Example 25 | 48 | 110 | 43 | 0.18 |
| Example 26 | 46 | 122 | 53 | 0.14 |
| Example 27 | 52 | 116 | 65 | 0.14 |
| Example 28 | 58 | 112 | 52 | 0.12 |
| Example 29 | 57 | 124 | 71 | 0.12 |

Example 31

This block polymer was synthesized in a similar way as described in example 1 synthesis, using following compositions: BisK (4.99 g), SBisK (12.84 g), Oligomer 1 (15.67 g), Bis(4-hydroxylphenyl)-1,4-diisopropylbenzene (20.78 g), and anhydrous potassium carbonate (10.78 g).

Example 32

This block polymer was synthesized in a similar way as described in Example 13 synthesis, using following compositions: BisK (4.70 g), SBisK (13.40 g), Oligomer 7 (15.67 g), Bis(4-hydroxylphenyl)-1,4-diisopropylbenzene (20.78 g), and anhydrous potassium carbonate (10.78 g).

Example 33

This block polymer was synthesized in a similar way as described in Example 13 synthesis, using following compositions: BisK (4.38 g), SBisK (14.01 g), Oligomer 7 (15.67 g), Bis(4-hydroxylphenyl)-1,4-diisopropylbenzene (20.78 g), and anhydrous potassium carbonate (10.78 g).

Example 34

This block polymer was synthesized in a similar way as described in Example 13 synthesis, using following compositions: BisK (3.24 g), SBisK (14.80 g), Oligomer 7 (23.51 g), Bis(4-hydroxylphenyl)-1,4-diisopropylbenzene (20.78 g), and anhydrous potassium carbonate (10.78 g). MEA 22 contains this block copolymer.

Example 35

This block polymer was synthesized in a similar way as described in Example 13 synthesis, using following compositions: BisK (2.89 g), SBisK (15.48 g), Oligomer 7 (23.51 g), Bis(4-hydroxylphenyl)-1,4-diisopropylbenzene (20.78 g), and anhydrous potassium carbonate (10.78 g). MEA 23 contains this block copolymer.

Example 36

This block polymer was synthesized in a similar way as described in Example 13 synthesis, using following compositions: BisK (2.49 g), SBisK (16.27 g), Oligomer 7 (23.51 g), Bis(4-hydroxylphenyl)-1,4-diisopropylbenzene (20.78 g), and anhydrous potassium carbonate (10.78 g). MEA 24 contains this block copolymer.

Example 37

This block polymer was synthesized in a similar way as described in Example 13 synthesis, using following compositions: BisK (1.23 g), SBisK (14.00 g), Oligomer 7 (26.12 g), Bis(4-hydroxylphenyl)-1,4-diisopropylbenzene (17.32 g), and anhydrous potassium carbonate (8.98 g).

TABLE 4

Ex-situ Data Summary for Block Polymers 31-37

| Membrane | IEC (meq/g) | $[\eta]_{25}$ (dL/g) | SW (%) | σ r.t./boiled (S/cm) | Methanol crossover r.t./boiled (mg · mil/ cc · min · cm²) | Water uptake (%, w/w) | λ (H$_2$O/ H$^+$) |
|---|---|---|---|---|---|---|---|
| Example 31 | 1.20 | 1.88 | 27 | 0.023/0.040 | NA/0.010 | 25 | 12 |
| Example 32 | 1.25 | 1.65 | 31 | 0.025/0.042 | 0.010/0.016 | 26 | 12 |
| Example 33 | 1.30 | 1.86 | 30 | 0.030/0.041 | 0.010/0.020 | 30 | 13 |
| Example 34 | 1.20 | 1.17 | 28 | 0.024/0.041 | 0.010/0.014 | 25 | 12 |
| Example 35 | 1.25 | 1.67 | 30 | 0.025/0.045 | 0.011/0.017 | 27 | 12 |
| Example 36 | 1.30 | 1.72 | 33 | 0.031/0.048 | 0.014/0.025 | 30 | 13 |
| Example 37 | 1.20 | 1.38 | 27 | 0.025/0.038 | NA | 24 | 11 |

TABLE 5

In-Situ Data Summary for Block Polymers 31-37

| Membrane | Thickness (μ) | Power density at 0.4 V (mW/cm²) | Methanol crossover (mA/cm²) | HFR (Ohm · cm²) |
|---|---|---|---|---|
| Example 31 | 54 | 105 | 33 | 0.21 |
| Example 32 | 52 | 120 | 37 | 0.19 |
| Example 33 | 55 | 108 | 40 | 0.19 |
| Example 34 | 53 | 102 | 33 | 0.22 |
| Example 35 | 54 | 114 | 33 | 0.20 |
| Example 36 | 50 | 122 | 49 | 0.16 |
| Example 37 | 52 | 100 | 37 | 0.18 |

Example 38

This block polymer was synthesized in a similar way as described in Example 13 synthesis, using following compositions: 2,6-difluorobenzonitrile (6.10 g), SBisK (13.35 g), Oligomer 7 (22.21 g), 2,2'-Biphenol (15.83 g), and anhydrous potassium carbonate (15.27 g).

Example 39

This block polymer was synthesized in a similar way as described in Example 13 synthesis, using following compositions: 2,6-difluorobenzonitfile (5.88 g), SBisK (14.03 g), Oligomer 7 (22.21 g), 2,2'-Biphenol (15.83 g), and anhydrous potassium carbonate (15.27 g). MEA 27 contains this block copolymer.

Example 40

This block polymer was synthesized in a similar way as described in Example 13 synthesis, using following compositions: 2,6-difluorobenzonitrile (5.31 g), SBisK (13.88 g), Oligomer 7 (20.90 g), 2,2'-Biphenol (14.90 g), and anhydrous potassium carbonate (14.37 g).

Example 41

This block polymer was synthesized in a similar way as described in Example 13 synthesis, using following compositions: 2,6-difluorobenzonitrile (3.88 g), SBisK (14.57 g), Oligomer 7 (29.39 g), 2,2'-Biphenol (13.96 g), and anhydrous potassium carbonate (13.48 g).

Example 42

This block polymer was synthesized in a similar way as described in Example 13 synthesis, using following compositions: 2,6-difluorobenzonitrile (3.66 g), SBisK (15.23 g), Oligomer 7 (29.39 g), 2,2'-Biphenol (13.96 g), and anhydrous potassium carbonate (13.47 g).

Example 43

This block polymer was synthesized in a similar way as described in Example 13 synthesis, using following compositions: 2,6-difluorobenzonitrile (3.18 g), SBisK (14.93 g), Oligomer 7 (27.43 g), 2,2'-Biphenol (13.03 g), and anhydrous potassium carbonate (12.58 g).

Example 44

This block polymer was synthesized in a similar way as described in Example 13 synthesis, using following compositions: 2,6-difluorobenzonitrile (1.92 g), SBisK (13.83 g), Oligomer 7 (31.35 g), 2,2'-Biphenol (11.17 g), and anhydrous potassium carbonate (10.78 g).

Example 45

This block polymer was synthesized in a similar way as described in Example 13 synthesis, using following compositions: 2,6-difluorobenzonitrile (1.71 g), SBisK (14.47 g), Oligomer 7 (31.35 g), 2,2'-Biphenol (11.17 g), and anhydrous potassium carbonate (10.78 g).

Example 46

This block polymer was synthesized in a similar way as described in Example 13 synthesis, using following compositions: 2,6-difluorobenzonitrile (1.47 g), SBisK (15.20 g), Oligomer 7 (31.35 g), 2,2'-Biphenol (11.17 g), and anhydrous potassium carbonate (10.78 g).

Example 47

This block polymer was synthesized in a similar way as described in Example 13 synthesis, using following compositions: 2,6-difluorobenzonitrile (3.62 g), SBisK (13.39 g), Oligomer 7 (16.98 g), Bis(4-hydroxylphenyl)-1,4-diisopropylbenzene (22.52 g), and anhydrous potassium carbonate (11.68 g).

Example 48

This block polymer was synthesized in a similar way as described in Example 13 synthesis, using following compositions: 2,6-difluorobenzonitrile (2.17 g), SBisK (14.49 g), Oligomer 7 (23.51 g), Bis(4-hydroxylphenyl)-1,4-diisopropylbenzene (20.78 g), and anhydrous potassium carbonate (10.78 g).

TABLE 7

In-Situ Data Summary for Block Polymers 38-44, 47 and 48

| Membrane | Thickness (μ) | Power density at 0.4 V (mW/cm$^2$) | Methanol crossover (mA/cm$^2$) | HFR (Ohm·cm$^2$) |
|---|---|---|---|---|
| Example 38 | 50 | 92 | 31 | 0.23 |
| Example 39 | 47 | 118 | 36 | 0.20 |
| Example 40 | 44 | 130 | 64 | 0.13 |
| Example 41 | 56 | 110 | 39 | 0.22 |
| Example 42 | 43 | 106 | 61 | 0.15 |
| Example 43 | 49 | 112 | 57 | 0.14 |
| Example 44 | 47 | 112 | 42 | 0.16 |
| Example 47 | 52 | 106 | 39 | 0.22 |
| Example 48 | 55 | 118 | 34 | 0.21 |

Example 49

F-ended Oligomer 8: DP=6

This oligomer was synthesized in a similar way as described in the oligomer 13 synthesis, using following compositions: BisK (65.46 g), 9,9-bis(4-hydroxyphenyl)fluorene (87.60 g), and anhydrous potassium carbonate (26.95 g), 540 mL of DMSO and 270 mL of Toluene.

Example 50

A block polymer was synthesized in a similar way as described in Example 13 synthesis, using following compositions: BisK (3.97 g), SBisK (14.82 g), Oligomer 8 (22.78 g), Bis(4-hydroxylphenyl)-1,4-diisopropylbenzene (20.78 g), and anhydrous potassium carbonate (10.78 g).

Example 51

This block polymer was synthesized in a similar way as described in Example 13 synthesis, using following compositions: BisK (3.02 g), SBisK (12.90 g), Oligomer 8 (18.98 g), Bis(4-hydroxylphenyl)-1,4-diisopropylbenzene (17.32 g), and anhydrous potassium carbonate (8.98 g).

TABLE 6

Ex-situ Data Summary for Block Polymers 26-48

| Membrane | IEC (meq/g) | $[\eta]_{25}$ (dL/g) | SW (%) | σ r.t./boiled (S/cm) | Methanol crossover r.t./boiled (mg·mil/ cc·min·cm$^2$) | Water uptake (%, w/w) | λ (H$_2$O/ H$^+$) |
|---|---|---|---|---|---|---|---|
| Example 38 | 1.20 | 2.77 | 17 | 0.026/0.033 | NA/0.007 | 18 | 8 |
| Example 39 | 1.25 | 1.92 | 24 | 0.031/0.033 | NA/0.010 | 24 | 11 |
| Example 40 | 1.30 | 1.91 | 26 | 0.037/0.046 | NA | 31 | 11 |
| Example 41 | 1.20 | 2.23 | 30 | 0.029/0.036 | NA/0.013 | 25 | 12 |
| Example 42 | 1.25 | 2.13 | 21 | 0.034/0.046 | NA/0.012 | 26 | 11 |
| Example 43 | 1.30 | 1.29 | 27 | 0.037/0.052 | NA | 28 | 12 |
| Example 44 | 1.20 | 1.36 | 22 | 0.030/0.038 | NA | 22 | 10 |
| Example 45 | 1.25 | 0.93 | 25 | 0.031/0.044 | NA | 31 | 14 |
| Example 46 | 1.30 | 0.81 | 25 | 0.037/0.047 | NA | 28 | 12 |
| Example 47 | 1.20 | 1.13 | 31 | 0.023/0.035 | NA/0.013 | 25 | 12 |
| Example 48 | 1.20 | 0.93 | 33 | 0.024/0.036 | NA/0.014 | 23 | 11 |

Example 52

This block polymer was synthesized in a similar way as described in Example 13 synthesis, using following compositions: BisK (2.70 g), SBisK (13.51 g), Oligomer 8 (18.98 g), Bis(4-hydroxylphenyl)-1,4-diisopropylbenzene (17.32 g), and anhydrous potassium carbonate (8.98 g).

Example 53

This block polymer was synthesized in a similar way as described in Example 13 synthesis, using following compositions: BisK (1.28 g), SBisK (13.34 g), Oligomer 8 (25.63 g), Bis(4-hydroxylphenyl)-1,4-diisopropylbenzene (15.59 g), and anhydrous potassium carbonate (8.08 g).

Example 54

This block polymer was synthesized in a similar way as described in Example 13 synthesis, using following compositions: BisK (0.95 g), SBisK (13.97 g), Oligomer 8 (25.63 g), Bis(4-hydroxylphenyl)-1,4-diisopropylbenzene (15.59 g), and anhydrous potassium carbonate (8.08 g).

Example 55

This block polymer was synthesized in a similar way as described in Example 13 synthesis, using following compositions: BisK (0.61 g), SBisK (14.63 g), Oligomer 8 (25.63 g), Bis(4-hydroxylphenyl)-1,4-diisopropylbenzene (15.59 g), and anhydrous potassium carbonate (8.08 g).

Example 56

This block polymer was synthesized in a similar way as described in Example 13 synthesis, using following compositions: BisK (5.34 g), SBisK (12.16 g), Oligomer 8 (22.78 g), 2,2'-Biphenol (11.17 g), and anhydrous potassium carbonate (10.78 g).

Example 57

This block polymer was synthesized in a similar way as described in Example 13 synthesis, using following compositions: BisK (4.65 g), SBisK (13.50 g), Oligomer 8 (22.78 g), BisZ (16.10 g), and anhydrous potassium carbonate (10.78 g).

Example 58

This block polymer was synthesized in a similar way as described in Example 13 synthesis, using following compositions: BisK (3.97 g), SBisK (14.82 g), Oligomer 8 (22.78 g), Bis(4-hydroxylphenyl)-1,4-diisopropylbenzene (20.78 g), and anhydrous potassium carbonate (10.78 g).

TABLE 8

Ex-situ Data Summary for Block Polymers 37-42

| Membrane | IEC (meq/g) | $[\eta]_{25}$ (dL/g) | SW (%) | σ r.t./boiled (S/cm) | Methanol crossover r.t./boiled (mg · mil/ cc · min · cm$^2$) | Water uptake (%, w/w) | λ (H$_2$O/ H$^+$) |
|---|---|---|---|---|---|---|---|
| Example 50 | 1.20 | 1.09 | 28 | 0.020/0.033 | 0.007/0.026 | 28 | 13 |
| Example 51 | 1.25 | 0.97 | 31 | 0.024/0.037 | 0.008/0.017 | 27 | 12 |
| Example 52 | 1.30 | 0.86 | 40 | 0.029/0.046 | 0.011/0.020 | 28 | 12 |
| Example 53 | 1.20 | 0.89 | 27 | 0.021/0.033 | 0.006/0.019 | 23 | 11 |
| Example 54 | 1.25 | 1.02 | 29 | 0.025/0.037 | 0.008/0.030 | 25 | 11 |
| Example 55 | 1.30 | 1.18 | 33 | 0.028/0.044 | 0.008/0.032 | 27 | 12 |

Example 59

OH-ended Oligomer 9: DP=4

This oligomer 9 was synthesized in a similar way as described in the oligomer 17 synthesis, using following compositions: BisK (43.90 g), 9,9-bis(4-hydroxyphenyl)fluorene (94.00 g), and anhydrous potassium carbonate (48.20 g), 540 mL of DMSO and 270 mL of Toluene.

Example 60

This block polymer was synthesized in a similar way as described in Example 13 synthesis, using following compositions: BisK (9.37 g), SBisK (15.64 g), Oligomer 9 (19.72 g), BisZ (19.32 g), and anhydrous potassium carbonate (14.37 g).

Example 61

This block polymer was synthesized in a similar way as described in Example 13 synthesis, using following compositions: BisK (5.04 g), SBisK (15.59 g), Oligomer 9 (29.58 g), BisZ (12.88 g), and anhydrous potassium carbonate (10.78 g).

Example 62

This block polymer was synthesized in a similar way as described in Example 13 synthesis, using following compositions: BisK (2.54 g), SBisK (16.22 g), Oligomer 9 (36.97 g), BisZ (9.39 g), and anhydrous potassium carbonate (8.98 g).

TABLE 9

Ex-situ Data Summary for Block Polymers 43-45

| Membrane | IEC(meq/g) | $[\eta]_{25}$ (dL/g) | SW (%) | σ r.t./boiled (S/cm) | Methanol crossover r.t./boiled (mg · mil/ cc · min · cm$^2$) | Water uptake (%, w/w) | λ (H$_2$O/ H$^+$) |
|---|---|---|---|---|---|---|---|
| Example 60 | 1.25 | 0.85 | 30 | 0.021/0.032 | 0.015 | 25 | 12 |
| Example 61 | 1.25 | 0.53 | 31 | 0.024/0.034 | 0.022 | 28 | 13 |
| Example 62 | 1.25 | 0.56 | 33 | 0.019/0.029 | 0.013 | 26 | 12 |

TABLE 10

In-Situ Data Summary for Block Polymers 2, 43-47.

| Membrane | Power density at 0.4 V (mW/cm$^2$) | Methanol crossover (mA/cm$^2$) | HFR (Ohm · cm$^2$) |
|---|---|---|---|
| Example 2 | 83 | 53 | 0.15 |
| Example 43 | 87 | 65 | 0.20 |
| Example 44 | 90 | 96 | 0.19 |
| Example 45 | 103 | 31 | 0.21 |
| Example 46 | 93 | 33 | 0.25 |
| Example 47 | 73 | 25 | 0.24 |

MEA testing conditions: 3 mg/cm$^2$ Pt—Ru in anode, 2 mg/cm$^2$ Pt in cathode, 60° C. cell temperature, 2.5 stoichiometric air flow, 1 M methanol fuel.

The following examples provide further support for the types of reactions and polymers described throughout this specification.

Example 63

Oligomer 10: DP=4

This oligomer was synthesized in a similar way as described for oligomer 10, using following compositions: 4,4'-difluorobenzophone (BisK, 34.91 g, 0.16 mol), 9,9-bis (4-hydroxyphenyl)fluorene (42.05 g, 0.12 mol), and anhydrous potassium carbonate (25.87 g, 0.187 mol), 220 mL of DMSO and 110 mL of toluene.

This block polymer was synthesized in a similar way as described in Example 1, using following compositions: 4,4'-difluorobenzophone (BisK, 7.75 g, 0.0355 mol), 3,3'-disulfonated-4,4'-difluorobenzophone ((SBisK, 15.00 g, 0.0355 mol), Oligomer 1 (20.90 g), BisZ (21.47 g, 0.08 mol), and anhydrous potassium carbonate (14.37 g, 0.10 mol), 250 mL of DMSO and 125 mL of toluene. This polymer has an inherent viscosity of 0.49 dl/g in DMAc (0.25 g/dl). Its one-day swelling in 8 M methanol at 80° C. was 52%, cross-over in 8 M methanol was 0.016 mg.mil/cc.min.cm$^2$ (non-boiled, conductivity was 0.013 S/cm (non-boiled) and 0.034 S/cm (boiled).

Example 64

This block polymer was synthesized in a similar way as described in example 1, using following compositions: 4,4'-difluorobenzophone (BisK, 5.72 g, 0.026 mol), 3,3'-disulfonated-4,4'-difluorobenzophone ((SBisK, 17.04 g, 0.040 mol), Oligomer 10 (19.59 g), BisZ (20.12 g, 0.075 mol), and anhydrous potassium carbonate (13.47 g, 0.097 mol), 250 mL of DMSO and 125 mL of Toluene. This polymer has an inherent viscosity of 0.72 dl/g in DMAc (0.25 g/dl).

Example 65

This block polymer was synthesized in a similar way as described in example 1, using following compositions: 4,4'-difluorobenzophone (BisK, 4.68 g, 0.021 mol), 3,3'-disulfonated-4,4'-difluorobenzophone (SbisK, 19.06 g, 0.045 mol), Oligomer 10 (19.59 g), 9,9-bis(4-hydroxyphenyl)fluorine (26.28 g, 0.075 mol), and anhydrous potassium carbonate (13.47 g, 0.097 mol), 250 mL of DMSO and 125 mL of Toluene.

Example 66

This block polymer was synthesized in a similar way as described in example 1, using following compositions: 4,4'-difluorobenzophone (BisK, 4.68 g, 0.021 mol), 3,3'-disulfonated-4,4-difluorobenzophone (SBisK, 19.06 g, 0.040 mol), Oligomer 10 (19.59 g), bisphenol (13.96 g, 0.075 mol), and anhydrous potassium carbonate (13.47 g, 0.075 mol), 250 mL of DMSO and 125 mL of toluene.

Example 67

This example illustrates block copolymer system using BisK-O block in the non-ionic region, and SBisK-Z in ionic region, the non-ionic region consists of 11%. Size 6 of BisK-O block.

Oligomer 11: DP=6

This oligomer was synthesized in a similar way as described for oligomer 10, using following compositions: 4,4'-difluorobenzophone (BisK, 65.46 g, 0.30 mol), 4,4'-dihydroxydiphenyl ether (0, 50.55 g, 0.25 mol), and anhydrous potassium carbonate (44.92 g, 0.325 mol), 540 mL of DMSO and 270 mL of toluene.

This block polymer was synthesized in a similar way as described in example 1, using following compositions: 4,4'-diflorobenzophone (BisK, 6.51 g, 0.030 mol), 3,3'-disulfonated-4,4-difluorobenzophone (SBisK, 17.40 g, 0.041 mol), Oligomer 11 (22.40 g), BisZ (21.47 g, 0.08 mol), and anhydrous potassium carbonate (14.37 g, 0.10 mol), 250 mL of DMSO and 125 mL of toluene.

Example 68

This block polymer was synthesized in a similar way as described in example 1, using following compositions: 4,4'-difluorobenzophone (BisK, 4.68 g, 0.021 mol), 3,3'-disulfonated-4,4'-difluorobenzophone (SBisK, 19.06 g, 0.040 mol), Oligomer 2 (19.59 g), 1,5-dihydroxynaphthalene (12.01 g, 0.075 mol), and anhydrous potassium carbonate (13.47 g, 0.097 mol), 250 mL of DMSO and 125 mL of toluene.

Examples 69-75 illustrate block copolymer system using same BisK-Z in non-ionic region, but sBisK with various aryl phenol groups block having different chain mobility and chemical affinity in the ionic region. The non-ionic block size is 8 and block concentration is 11%.

Example 69 Illustrates Ionic Region Consist of sBisK-Z Unit

Oligomer 12: DP=8

This oligomer 12 was synthesized in a similar way as described in oligomer 1, using following compositions: 4,4'-difluorobenzophone (BisK, 65.46 g, 0.3 mol), BisZ (70.44 g, 0.262 mol), and anhydrous potassium carbonate (17.97 g, 0.13 mol), 540 mL of anhydrous DMSO (270 mL) of toluene. This block polymer was synthesized in a similar way as described in example 1, using following compositions: 4,4'-difluorobenzophone (BisK, 4.57 g, 0.021 mol), 3,3'-disulfonated-4,4'-difluorobenzophone (SBisZ 17.41 g, 0.041 mol), Oligomer 12 (29.72 g), BisZ (18.78 g, 0.07 mol), and anhydrous potassium carbonate (12.57 g, 0.091 mol), 270 mL of anhydrous DMSO and 135 mL of toluene. This polymer has an inherent viscosity of 0.62 dl/g in DMAc (0.25 g/dl).

Example 70

Illustrates Ionic Region Consist of sBisK-FL Unit

This block polymer was synthesized in a similar way as described in example 1, using following compositions: 4,4'-difluorobenzophone (BisK, 3.91 g, 0.0179 mol), 3,3'-disulfonated-4,4'-difluorobenzophone (SBisK, 14.92 g, 0.06 mol), Oligomer 12 (25.27 g), 9,9-bis(4-hydroxyphenyl)fluorene (21.02 g, 0.07 mol), and anhydrous potassium carbonate (10.78 g, 0.078 mol), 250 mL of DMSO and 125 mL of toluene. This polymer has an inherent viscosity of 0.84 dl/g in DMAc (0.25 g/dl).

Example 71

Illustrates Ionic Region Consist of sBisK-AF Unit

This block polymer was synthesized in a similar way as described in example 1, using following compositions: 4,4'-difluorobenzophone (BisK, 3.91 g, 0.0179 mol), 3,3'-disulfonated-4,4'-difluorobenzophone ((SBisK, 14.92 g, 0.035 mol), Oligomer 12 (25.47 g), 4,4'-(Hexafluoroisopropylidene)-diphenol (20.17 g, 0.06 mol), and anhydrous potassium carbonate (10.78 g, 0.078 mol), 250 mL of DMSO and 125 mL of toluene.

This polymer has an inherent viscosity of 0.47 dl/g in DMAc (0.25 g/dl).

Example 72

Illustrates Ionic Region Consisting of sBisK-B Unit

This block polymer was synthesized in a similar way as described in example 1, using following compositions: 4,4'-difluorobenzophone (BisK, 4.57 g, 0.021 mol), 3,3'-disulfonated-4,4'-difluorobenzophone (SBisK, 17.41 g, 0.041 mol), Oligomer 12 (29.72 g), 4,4'-dihydroxybiphenyl (13.03 g, 0.07 mol), and anhydrous potassium carbonate (12.57 g, 0.091 mol), 250 mL of DMSO and 125 mL of toluene. This polymer has an inherent viscosity of 1.01 dl/g in DMAc (0.25 g/dl).

Example 73

Illustrates Ionic Region Consisting of sBisK-O Unit

This block polymer was synthesized in a similar way as described in example 1, using following compositions: 4,4'-difluorobenzophone (BisK, 4.57 g, 0.021 mol), 3,3'-disulfonated-4,4'-difluorobenzophone ((SBisK, 17.41 g, 0.041 mol), Oligomer 12 (29.72 g), 4,4'-dihydroxydiphenyl ether (14.15 g, 0.07 mol), and anhydrous potassium carbonate (12.57 g, 0.091 mol), 250 mL of DMSO and 125 mL of toluene. This polymer has an inherent viscosity of 0.94 dl/g in DMAc (0.25 g/dl).

Example 74

This block polymer was synthesized in a similar way as described in example 1, using following compositions: 4,4'-difluorobenzophone (BisK, 1.298 g, 0.0059 mol), 3,3'-disulfonated-4,4'-difluorobenzophone (SBisK, 23.736 g, 0.056 mol), Oligomer 12 (29.72 g), 4,4'-dihydroxydiphenyl (13.03 g, 0.07 mol), and anhydrous potassium carbonate (12.57 g, 0.091 mol), 250 mL of DMSO and 125 mL of toluene. This polymer has an inherent viscosity of 1.35 dl/g in DMAc (0.25 g/dl).

Example 75

This block polymer was synthesized in a similar way as described in example 1, using following compositions: 4,4'-difluorobenzophone (BisK, 3.91 g, 0.018 mol), 3,3'-disulfonated-4,4'-difluorobenzophone (SBisK, 14.92 g, 0.035 mol), Oligomer 12 (25.47 g), 1,5-dihydroxynaphthalene (9.61 g, 0.060 mol), and anhydrous potassium carbonate (10.71 g, 0.078 mol), 206 mL of DMSO and 103 mL of Toluene. This polymer has an inherent viscosity of 1.10 dl/g in DMAc (0.25 g/dl).

TABLE 11 summarizes the impact of the chain length and flexible in the ionic region on the final membrane properties from Examples 10-16.

| Polymer | One-day Swelling (%) | Cross-over in 8M Methanol (mg · mil/cc · min · cm$^2$) (Non-boiled/boiled) | Conductivity (S/cm) (Non-boiled/boiled) |
| --- | --- | --- | --- |
| Example 7 | 116 | 0.034/0.081 | 0.38/0.055 |
| Example 8 | 46 | 0.025/0.020 | 0.026/0.045 |
| Example 9 | 141 | 0.0320/0.11 | 0.025/0.35 |
| Example 10 | 47 | 0.036 | 0.047/0.075 |
| Example 11 | 155 | 0.038/0.11 | 0.059/0.058 |
| Example 12 | 62 | 0.026/0.046 | 0.061/0.085 |
| Example 13 | 94 | 0.056/0.098 | 0.10/0.11 |

Example 76 illustrates block copolymer system using BisK-Z block in the non-ionic region, and multi components (more than 2 unit) in the ionic region, in comparison of random copolymer of multi components system.

Example 76

This block polymer was synthesized in a similar way as described in example 1, using following compositions: 4,4'-difluorobenzophone (BisK, 3.91 g, 0.0179 mol), 3,3'-disulfonated-4,4'-difluorobenzophone ((SBisK, 14.92 g, 0.035 mol), Oligomer 12 (25.27 g), BisZ (8.05 g, 0.035 mol), 9,9-bis(4-hydroxyphenyl)fluorene (10.51 g, 0.035 mol), and anhydrous potassium carbonate (10.78 g, 0.078 mol), 250 mL of DMSO and 125 mL of toluene. This polymer has an inherent viscosity of 1.02 dl/g in DMAc (0.25 g/dl). Its one-day swelling in 8 M methanol at 80° C. was 63%, cross-over in 8 M methanol was 0.036 mg.milcc.min.cm$^2$ (non-boiled) and 0.038 mg.mil/cc.min.cm$^2$ (boiled), conductivity was 0.026 S/cm (non-boiled) and 0.047 S/cm (boiled).

Example 77

Oligomer 13 (FL4): DP=4

In a 500 mL three necked round flask, equipped with a mechanical stirrer, a thermometer probe connected with a nitrogen inlet, and a Dean-Stark trap/condenser, 4,4'-difluorobenzophone (BisK, 34.91 g, 0.16 mol), 9,9-bis(4-hydroxyphenyl)fluorene (42.05 g, 0.12 mol), and anhydrous potassium carbonate (25.87 g, 0.187 mol), 220 mL of DMSO and 110 mL of Toluene. The reaction mixture was slowly stirred under a slow nitrogen stream. After heating at ~85° C. for 1 h and at ~120° C. for 1 h, the reaction temperature was raised to ~135° C. for 3 h, and finally to ~170° C. for 2 h. After cooling to ~70° C. with continuing stirring, the solution was dropped into 1 L of cooled methanol with a vigorous stirring. The precipitates were filtrated and washed with DI-water four times and dried at 80° C. overnight, and then dried at 80° C. under vacuum for 2 days.

This block polymer was synthesized in a similar way as described in the oligomer 1 synthesis, using following compositions: 4,4'-difluorobenzophone (BisK, 4.68 g), 3,3'-disulfonated-4,4'-difluorobenzophone (SBisK, 19.06 g), Oligomer 13 (19.59 g), 9,9-bis(4-hydroxyphenyl)fluorene (26.28 g), and anhydrous potassium carbonate (13.48 g), 240 mL of DMSO and 120 mL of Toluene. This polymer has an inherent viscosity of 1.00 dl/g in DMAc (0.25 g/dl).

Example 78

This block polymer was synthesized in a similar way as described in the oligomer 10 synthesis, using following compositions: 4,4'-difluorobenzophone (BisK, 4.68 g), 3,3'-disulfonated-4,4'-difluorobenzophone (SBisK, 19.06 g), Oligomer 10 (19.59 g), 4,4'-biphenol (13.97 g), and anhydrous potassium carbonate (13.48 g), 240 mL of DMSO and 120 mL of Toluene. This polymer has an inherent viscosity of 1.89 dl/g in DMAc (0.25 g/dl).

Example 79

This block polymer was synthesized in a similar way as described in the oligomer 1 synthesis, using following compositions: 4,4'-difluorobenzophone (BisK, 4.68 g), 3,3'-disulfonated-4,4'-difluorobenzophone (SBisK, 19.06 g), Oligomer 10 (19.59 g), 2,7-dihydroxynaphthalene (12.01 g), and anhydrous potassium carbonate (13.48 g), 240 mL of DMSO and 120 mL of Toluene. This polymer has an inherent viscosity of 1.00 dl/g in DMAc (0.25 g/dl).

Example 80

Oligomer 14 (A8): DP=8

This oligomer was synthesized in a similar way as described in the oligomer 1 synthesis, using following compositions: 4,4'-difluorobenzophone (BisK, 87.28 g), 4,4'-(1,4-phenylenediisopropylidene)bisphenol (79.90 g), and anhydrous potassium carbonate (62.88 g), 560 mL of DMSO and 280 mL of Toluene.

A block polymer was synthesized in a similar way as described in the oligomer 1 synthesis, using following compositions: 4,4'-difluorobenzophone (BisK, 1.94 g), 3,3'-disulfonated-4,4'-difluorobenzophone (SBisK, 7.50 g), Oligomer 14 (11.66 g), 9,9-bis(4-hydroxyphenyl)fluorene (10.51 g), and anhydrous potassium carbonate (5.39 g), 120 mL of DMSO and 60 mL of Toluene. This polymer has an inherent viscosity of 0.84 dl/g in DMAc (0.25 g/dl).

Example 81

This block polymer was synthesized in a similar way as described in the oligomer 1 synthesis, using following compositions: 4,4'-difluorobenzophone (BisK, 1.94 g), 3,3'-disulfonated-4,4'-difluorobenzophone (SBisK, 7.50 g), Oligomer 14 (11.66 g), 4,4'-biphenol (5.58 g), and anhydrous potassium carbonate (5.39 g), 120 mL of DMSO and 60 mL of Toluene. This polymer has an inherent viscosity of 1.12 dl/g in DMAc (0.25 g/dl).

Example 82

This block polymer was synthesized in a similar way as described in the oligomer 1 synthesis, using following compositions: 4,4'-difluorobenzophone (BisK, 1.94 g), 3,3'-disulfonated-4,4'-difluorobenzophone (SBisK, 7.50 g), Oligomer 14 (11.66 g), 1,1-bis(4-hydroxyphenyl)cyclohexane (8.05 g), and anhydrous potassium carbonate (5.39 g), 120 mL of DMSO and 60 mL of Toluene. This polymer has an inherent viscosity of 0.64 dl/g in DMAc (0.25 g/dl).

Example 83

This block polymer was synthesized in a similar way as described in the oligomer 1 synthesis, using following compositions: 4,4'-difluorobenzophone (BisK, 0.64 g), 3,3'-disulfonated-4,4'-difluorobenzophone (SBisK, 11.88 g), Oligomer 14 (13.60 g), 9,9-bis(4-hydroxyphenyl)fluorene (12.26 g), and anhydrous potassium carbonate (6.29 g), 150 mL of DMSO and 75 mL of Toluene. This polymer has an inherent viscosity of 0.68 dl/g in DMAc (0.25 g/dl).

Example 84

This block polymer was synthesized in a similar way as described in the oligomer 1 synthesis, using following compositions: 4,4'-difluorobenzophone (BisK, 1.94 g), 3,3'-disulfonated-4,4'-difluorobenzophone (SBisK, 7.50 g), Oligomer 14 (11.66 g), 4,4'-(1,4-phenylenediisopropylidene)bisphenol (6.85 g), and anhydrous potassium carbonate (5.39 g), 120 mL of DMSO and 60 mL of Toluene. This polymer has an inherent viscosity of 0.84 dl/g in DMAc (0.25 g/dl).

Example 85

This block polymer was synthesized in a similar way as described in the oligomer 1 synthesis, using following compositions: 4,4'-difluorobenzophone (BisK, 2.42 g), 3,3'-disulfonated-4,4'-difluorobenzophone (SBisK, 9.37 g), Oligomer 14 (14.57 g), 2,7-dihydroxynaphthalene (6.00 g), and anhydrous potassium carbonate (6.74 g), 120 mL of DMSO and 60 mL of Toluene. This polymer has an inherent viscosity of 0.97 dl/g in DMAc (0.25 g/dl).

Example 86

Oligomer 15 (AF8): DP=8

This oligomer was synthesized in a similar way as described in the oligomer 1 synthesis, using following compositions: 4,4'-difluorobenzophone (BisK, 87.28 g), 4,4'-(hexafluoroisopropylidene)diphenol (117.69 g), and anhydrous potassium carbonate (62.88 g), 560 mL of DMSO and 280 mL of Toluene.

Example 87

This block polymer was synthesized in a similar way as described in the oligomer 1 synthesis, using following compositions: 4,4'-difluorobenzophone (BisK, 3.88 g), 3,3'-disulfonated-4,4'-difluorobenzophone (SBisK, 15.00 g), Oligomer 15 (29.12 g), 1,1-bis(4-hydroxyphenyl)cyclohexane (16.10 g), and anhydrous potassium carbonate (10.78 g), 240 mL of DMSO and 120 mL of Toluene. This polymer has an inherent viscosity of 0.72 dl/g in DMAc (0.25 g/dl).

Example 88

This block polymer was synthesized in a similar way as described in the oligomer 1 synthesis, using following compositions: 4,4'-difluorobenzophone (BisK, 3.55 g), 3,3'-disulfonated-4,4'-difluorobenzophone (SBisK, 13.75 g), Oligomer 15 (26.70 g), 9,9-bis(4-hydroxyphenyl)fluorene (19.27 g), and anhydrous potassium carbonate (9.88 g), 240 mL of DMSO and 120 mL of Toluene. This polymer has an inherent viscosity of 0.50 dl/g in DMAc (0.25 g/dl).

Example 89

This block polymer was synthesized in a similar way as described in the oligomer 1 synthesis, using following compositions: 4,4'-difluorobenzophone (BisK, 4.20 g), 3,3'-disulfonated-4,4'-difluorobenzophone (SBisK, 16.25 g), Oligomer 15 (31.55 g), 4,4'-biphenol (12.10 g), and anhydrous potassium carbonate (11.68 g), 240 mL of DMSO and 120 mL of Toluene. This polymer has an inherent viscosity of 1.29 dl/g in DMAc (0.25 g/dl).

Example 90

This block polymer was synthesized in a similar way as described in the oligomer 1 synthesis, using following compositions: 4,4'-difluorobenzophone (BisK, 3.55 g), 3,3'-disulfonated-4,4'-difluorobenzophone (SBisK, 13.75 g), Oligomer 15 (26.70 g), 4,4'-(hexafluoroisopropylidene)diphenol (18.49 g), and anhydrous potassium carbonate (9.88 g), 240 mL of DMSO and 120 mL of Toluene. This polymer has an inherent viscosity of 0.54 dl/g in DMAc (0.25 g/dl).

Example 91

This block polymer was synthesized in a similar way as described in the oligomer 1 synthesis, using following compositions: 4,4'-difluorobenzophone (BisK, 4.20 g), 3,3'-disulfonated-4,4'-difluorobenzophone (SBisK, 16.25 g), Oligomer 15 (31.55 g), 2,7-dihydroxynaphthalene (10.41 g). and anhydrous potassium carbonate (11.68 g), 240 mL of DMSO and 120 mL of Toluene. This polymer has an inherent viscosity of 1.08 dl/g in DMAc (0.25 g/dl).

Synthesis of Regular Block Copolymers

When the preparation of the fluorine-terminated oligomer was complete, the solution was cooled to 120° C., and introduced directly into a reaction flask containing the phenoxide-terminated oligomer under nitrogen atmosphere. To obtain the equivalent molar ration of a phenoxide end-groups and fluorine end-groups, the phenoxide-terminated oligomer reaction flask was washed three times with 20 ml DMSO, and the solution was combined and also poured in the reaction flask. Then the temperature was again raised to 175-180° C., and maintained there for 6 h. The reaction mixture was filtered and a solid precipitated from acetone or methanol to get the crude product, then washed by hot water four times.

Conductivity: 0.046 S/cm, swelling by area in 8M methanol: 88%, 8M methanol cross-over: $8.3 \times 10^{-7}$ cm$^2$/sec.

Example 92

Synthesis of Partial Block Polymer with Non-Sulfonated Hydrophobic Segment

Fluorine End Group Oligomer 16 Preparation (Segment Size n=4)

In a 500 ml three necked round flask, equipped with a mechanical stirrer, thermometer, nitrogen inlet and Dean-Stark trap/condenser, Bis Z (80.508). Bis K (87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The oligomer precipitates from methanol to get the rude product, then washed by hot water four times. Dry at 80° C. oven for one day and 75° C. vacuum oven for 2 days.

Polymerization

In a 500 ml three necked round flask, equipped with a mechanical stirrer, thermometer, nitrogen inlet and Dean-Stark trap/condenser, Bis Z (13.418),Bis K (4.8878 g), S-Bis K (9.2884 g), oligomer 16 (11.2112 g), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the crude product.

Conductivity: 0.01 5 S/cm, Swelling by area in 8M methanol solution: 51%, 8M Methanol Cross-over: $3.5 \times 10^{-7}$ cm$^2$/sec.

Example 93

Synthesis of Partial Block Polymer with Non-Sulfonated Hydrophobic Segment

Fluorine End Group Oligomer 17 (BisZ/BisK) Preparation (Segment Size n=4)

In a 500 ml three necked round flask, equipped with a mechanical stirrer, thermometer, nitrogen inlet and Dean-Stark trap/condenser, Bis Z (80.508), Bis K (87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80C oven for one day and 75C vacuum oven for 2 days.

Polymerization

In a 500 ml three necked round flask, equipped with a mechanical stirrer, thermometer, nitrogen inlet and Dean-Stark trap/condenser, Bis Z (13.418), BisK (5.2368 g), S-Bis K (8.4444 g), oligomer 17 (12.0112 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C.

for 6 h, then increase temperature to 173-175° C. for 4-4.5 h. The reaction mixture precipitates from methanol to get the rude product.

Conductivity: 0.014 S/cm (0.038 S/cm, boiled), swelling by area in 8M methanol: 60%, 8M methanol cross-over: 0.019 mg/min.ml.mls.

Example 94

In a 500 ml three necked round flask, equipped with a mechanical stirrer, thermometer, nitrogen inlet and Dean-Stark trap/condenser, Bis Z (13.418), BisK (4.8878 g), S-Bis K (9.2884 g), oligomer 17 (11.2112 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.0146 S/cm (0.0378 S/cm, boiled), swelling by area in 8M methanol: 51%, 8M methanol cross-over: 0.022 mg/min.ml.mls.

Example 95

Synthesis of Partial Block Polymer with Non-Sulfonated Hydrophobic Segment

Fluorine End Group Oligomer 18 Preparation (Segment Size n=6)

In a 500 ml three necked round flask, equipped with a mechanical stirrer, thermometer, nitrogen inlet and Dean-Stark trap/condenser, Bis Z (89.4533 g), 4,4'-difluorobenzophone (Bis K, 87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80C oven for one day and 75C vacuum oven for 2 days.

Polymerization

In a 500 ml three necked round flask, equipped with a mechanical stirrer, thermometer, nitrogen inlet and Dean-Stark trap/condenser, Bis Z (13.418), Bis K (4.8878 g), 3,3'-disulfonated-4,4'-difluorobenzophone (S-Bis K, 8.444 g), oligomer(9.953 g, n=6, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Example 96

In a 500 ml three necked round flask, equipped with a mechanical stirrer, thermometer, nitrogen inlet and Dean-Stark trap/condenser, 4,4'-Biphenol (9.3105), Bis K (4.8878 g), S-Bis K (9.2884 g), oligomer 18 (11.2112 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.012 S/cm (0.0211 S/cm, boiled), swelling by area in 8M methanol: 21%,

Example 97

In a 500 ml three necked round flask, equipped with a mechanical stirrer, thermometer, nitrogen inlet and Dean-Stark trap/condenser, 4,4'-Biphenol (8.3794 g), Bis K (1.2444 g), S-Bis K (12.9794 g), oligomer 18 (18.00 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.0427 S/cm (0.078 S/cm, boiled), swelling by area in 8M methanol: 61%, 8M methanol cross-over: 0.052 mg/min.ml.mls.

Example 98

In a 500 ml three necked round flask, equipped with a mechanical stirrer, thermometer, nitrogen inlet and Dean-Stark trap/condenser, 4,4'-Biphenol (8.3794 g), Bis K (1.1032 g), S-Bis K (13.6625 g), oligomer 18 (15.1777 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.067 S/cm (0.096 S/cm, boiled), swelling by area in 8M methanol: 72%, 8M methanol cross-over: 0.06 mg/min.ml.mls.

Example 99

In a 500 ml three necked round flask, equipped with a mechanical stirrer, thermometer, nitrogen inlet and Dean-Stark trap/condenser, 4,4'-Biphenol (8.3794), Bis K (0.3078 g), S-Bis K (15.0287 g), oligomer 18 (16.0714 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.072 S/cm (0.0922 S/cm, boiled), swelling by area in 8M methanol: 98%, 8M methanol cross-over: 0.067 mg/min.ml.mls.

Example 100

In a 500 ml three necked round flask, equipped with a mechanical stirrer, thermometer, nitrogen inlet and Dean-Stark trap/condenser, 4,4'-(Hexafluoroisopropylidene)-diphenol (6F, 16.8065 g), Bis K (4.8878 g), S-Bis K (9.2884 g), oligomer 18 (11.2112 g, n=4, fluorine end of BisZ/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.007 S/cm (0.0122 S/cm, boiled), swelling by area in 8M methanol: 24%, 8M methanol cross-over: 0.016 mg/min.ml.mls.

Example 101

Synthesis of Partial Block Polymer with Non-Sulfonated Hydrophobic Segment

Fluorine End Group Oligomer 19 (6F/BisK) Preparation (Segment Size n=4)

In a 500 ml three necked round flask, equipped with a mechanical stirrer, thermometer, nitrogen inlet and Dean-Stark trap/condenser, 4,4'-(Hexafluoroisopropylidene)-diphenol (6F, 100.839 g), Bis K (87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80C oven for one day and 75C vacuum oven for 2 days Polymerization In a 500 ml three necked round flask, equipped with a mechanical stirrer, thermometer, nitrogen inlet and Dean-Stark trap/condenser, Bis Z (13.418), Bis K (4.8878 g), S-Bis K (9.2884 g), oligomer 19 (12.7333 g, n=4, fluorine end of 6F/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.01 14 S/cm (0.0321 S/cm, boiled), swelling by area in 8M methanol: 38%, 8M methanol cross-over: 0.013 mg/min.ml.mls.

Example 102

In a 500 ml three necked round flask, equipped with a mechanical stirrer, thermometer, nitrogen inlet and Dean-Stark trap/condenser, 4,4'-(1,4-phenyldiisopropyldiene) bisphenol (17.30 g), Bis K (4.8878 g), S-Bis K (9.2884 g), oligomer 19 (12.733 g, n=4, fluorine end of 6F/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.0102 S/cm (0.0215 S/cm, boiled), swelling by area in 8M methanol: 37%

Example 103

Synthesis of Partial Block Polymer with Non-Sulfonated Hydrophobic Segment

Fluorine End Group Oligomer 20 (6F/BisK) Preparation (Segment Size n=8)

In a 500 ml three necked round flask, equipped with a mechanical stirrer, thermometer, nitrogen inlet and Dean-Stark trap/condenser, 4,4'-(Hexafluoroisopropylidene)-diphenol (6F, 117.6455 g), Bis K (87.28 g), anhydrous potassium carbonate (54 g) were dissolved in a mixture DMSO and Toluene (about 20% solid concentration). The mixture was heated to toluene flux with stirring, keeping the temperature at 140° C. for 4 h, then increase temperature to 175° C. for 4 h. The reaction mixture precipitates from methanol to get the rude product, and then washed by hot water four times. Dry at 80C oven for one day and 75C vacuum oven for 2 days Polymerization In a 500 ml three necked round flask, equipped with a mechanical stirrer, thermometer, nitrogen inlet and Dean-Stark trap/condenser, Bis Z (13.418), Bis K (3.2729 g), S-Bis K (12.4151 g), oligomer 20 (24.2454 g, n=8, fluorine end of 6F/BisK composition), anhydrous potassium carbonate (9.0 g) were dissolved in a mixture DMSO and Toluene (about 20% solid concentration). The mixture was heated to toluene flux with stirring, keeping the temperature at 140° C. for 6 h, then increase temperature to 173-175° C. for 4-4.5 h. The reaction mixture precipitates from methanol to get the rude product.

Conductivity: 0.011 S/cm (0.0211 S/cm, boiled), swelling by area in 8M methanol: 37%, 8M methanol cross-over: 0.023 mg/min.ml.mls.

Example 104

Following examples demonstrate the effect of various block size and sulfonation degree Oligomer 21 Preparation (Block size n=4)

In a 2 L three necked round bottom flask, equipped with a mechanical stirrer, thermocouple, heating mantle, controller, nitrogen inlet and Dean-Stark trap/condenser, Bis Z (80.508), Bis K (87.28 g), anhydrous potassium carbonate (71.86 g) were dissolved in a mixture DMSO and toluene, 720 ml and 360 ml respectively (about 20% solid concentration). The mixture was heated to toluene reflux with stirring, keeping the temperature at 140° C. for 4 h, then increasing the temperature to 175° C. for 4 h. The reaction mixture was precipitated into 2 L of methanol to get the crude product; then washed with hot DI water four times. The product was oven dried at 80° C. for one day and vacuum dried at 75° C. for 2 days.

Polymerization

In a 500 ml three necked round bottom flask, equipped with a mechanical stirrer, thermocouple, heating mantle, controller, nitrogen inlet and Dean-Stark trap/condenser, Bis Z (13.418), Bis K (4.8878 g), S-Bis K sodium salt (9.2902 g), oligomer 21 (n=4) (11.2112 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The product was oven dried at 80C for one day and vacuum dried at 75C for 2 days. The dried sample (0.1250 g) was in 25 ml of dimethylacetamide (DMAc) to determine inherent viscosity. The inherent viscosity of the sodium salt polymer was found to be 0.67 dL/g. A sample was prepared for GPC analysis by dissolving 50 mg of polymer in 20 ml of DMAc containing 0.1 M LiBr. The sample was found to have a peak molecular weight of about 46, 350 based upon polystyrene standards.

Example 105

In a 500 ml three necked round bottom flask, equipped with a mechanical stirrer, thermocouple, heating mantle, controller, nitrogen inlet and Dean-Stark trap/condenser, Bis Z (13.418), Bis K (6.0441 g), S-Bis K sodium salt (7.0521 g), oligomer 21 (n=4) (17.2480 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The product was oven dried at 80C for one day and vacuum dried at 75C for 2 days. The dried sample (0.1250 g) was in 25 ml of dimethylacetamide (DMAc) to determine inherent viscosity. The inherent viscosity of the sodium salt polymer was found to be 0.49 dL/g.

Example 106

In a 500 ml three necked round bottom flask, equipped with a mechanical stirrer, thermocouple, heating mantle, controller, nitrogen inlet and Dean-Stark trap/condenser, Bis Z (13.418 g), Bis K (3.8621 g), S-Bis K sodium salt (11.2750 g), oligomer 21 (n=4) (17.2481 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The product was oven dried at 80C for one day and vacuum dried at 75C for 2 days. The dried sample (0.1250 g) was in 25 ml of dimethylacetamide (DMAc) to determine inherent viscosity. The inherent viscosity of the sodium salt polymer was found to be 0.643 dL/g.

Example 107

Oligomer 22 Preparation (Block size n=8)

In a 2 L three necked round bottom flask, equipped with a mechanical stirrer, thermocouple, heating mantle, controller, nitrogen inlet and Dean-Stark trap/condenser, Bis Z (70.4445 g), Bis K (65.4600 g), anhydrous potassium carbonate (47.1912 g) were dissolved in a mixture DMSO and toluene, 540 ml and 270 ml respectively (about 20% solid concentration). The mixture was heated to toluene reflux with stirring, keeping the temperature at 140° C. for 4 h, then increasing the temperature to 175° C. for 4 h. The reaction mixture was precipitated into 2 L of methanol to get the crude product; then washed with hot DI water four times. The product was oven dried at 80C for one day and vacuum dried at 75C for 2 days.

Polymerization

In a 500 ml three necked round bottom flask, equipped with a mechanical stirrer, thermocouple, heating mantle, controller, nitrogen inlet and Dean-Stark trap/condenser, Bis Z (13.4180 g), Bis K (3.2729 g), S-Bis K sodium salt (12.4151 g), oligomer 22 (n=8) (21.2299 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The product was oven dried at 80C for one day and vacuum dried at 75C for 2 days. The dried sample (0.1250 g) was in 25 ml of dimethylacetamide (DMAc) to determine inherent viscosity. The inherent viscosity of the sodium salt polymer was found to be 0.90 dL/g.

Example 108

In a 500 ml three necked round bottom flask, equipped with a mechanical stirrer, thermocouple, heating mantle, controller, nitrogen inlet and Dean-Stark trap/condenser, Bis Z (13.4180 g), Bis K (4.8223 g), S-Bis K sodium salt (9.4169 g), oligomer 22 (n=8) (21.2296 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The product was oven dried at 80° C. for one day and vacuum dried at 75° C. for 2 days. The dried sample (0.1250 g) was in 25 ml of dimethylacetamide (DMAc) to determine inherent viscosity. The inherent viscosity of the sodium salt polymer was found to be 0.935 dl/g. A sample was prepared for GPC analysis by dissolving 50 mg of polymer in 20 ml of DMAc containing 0.1 M LiBr. The sample was found to have a peak molecular weight of about 106,040 based upon polystyrene standards.

Example 109

In a 500 ml three necked round bottom flask, equipped with a mechanical stirrer, thermocouple, heating mantle, controller, nitrogen inlet and Dean-Stark trap/condenser, Bis Z (13.4180 g), Bis K (1.8984 g), S-Bis K sodium salt (15.0757 g), oligomer 22 (n=8) (21.2296 g), anhydrous potassium carbonate (17.9 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The product was oven dried at 80° C. for one day and vacuum dried at 75° C. for 2 days. The dried sample (0.1250 g) was in 25 ml of dimethylacetamide (DMAc) to determine inherent viscosity. The inherent viscosity of the sodium salt polymer was found to be 0.992 dL/g.

Example 110

Oligomer 23 Preparation (Block size n=2)

In a 2 L three necked round bottom flask, equipped with a mechanical stirrer, thermocouple, heating mantle, controller, nitrogen inlet and Dean-Stark trap/condenser, Bis Z (53.6721 g), Bis K (87.2800 g), anhydrous potassium carbonate (71.8692 g) were dissolved in a mixture DMSO and toluene, 750 ml and 360 ml respectively (about 20% solid concentration). The mixture was heated to toluene reflux with stirring, keeping the temperature at 140° C. for 4 h, then increasing the temperature to 175° C. for 4 h. The reaction mixture was precipitated into 2 L of methanol to get the crude product; then washed with hot DI water four times. The product was oven dried at 80° C. for one day and vacuum dried at 75° C. for 2 days.

Example 111

In a 500 ml three necked round bottom flask, equipped with a mechanical stirrer, thermocouple, heating mantle, controller, nitrogen inlet and Dean-Stark trap/condenser, Bis Z (20.1270 g), Bis K (8.5424 g), S-Bis K sodium salt (11.5917 g), oligomer 23 (n=2) (6.2215), anhydrous potassium carbonate (17.9 g) were dissolved in a mixture dimethylsulfoxide (DMSO) (190 ml) and toluene (100 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The product was oven dried at 80C for one day and vacuum dried at 75C for 2 days. The dried sample (0.1250 g) was in 25 ml of dimethylacetamide (DMAc) to determine inherent viscosity. The inherent viscosity of the sodium salt polymer was found to be 0.466 dL/g.

Example 112

In a 500 ml three necked round bottom flask, equipped with a mechanical stirrer, thermocouple, heating mantle, controller, nitrogen inlet and Dean-Stark trap/condenser, Bis Z (20.1270 g), Bis K (9.9827 g), S-Bis K sodium salt (8.8046 g), oligomer 23 (n=2) (6.2214 g), anhydrous potassium carbonate (27.0629 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The product was oven dried at 80C for one day and vacuum dried at 75C for 2 days.

Example 113

In a 500 ml three necked round bottom flask, equipped with a mechanical stirrer, thermocouple, heating mantle, controller, nitrogen inlet and Dean-Stark trap/condenser, Bis Z (20.1270 g), Bis K (7.2661), S-Bis K sodium salt (14.0620 g), oligomer 23 (n=2) (6.2217 g), anhydrous potassium carbonate (13.4759 g) were dissolved in a mixture dimethylsulfoxide (DMSO) (180 ml) and toluene (90 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times.

Example 114

Oligomer 24 Preparation (Block size n=12)

In a 1 L three necked round bottom flask, equipped with a mechanical stirrer, thermocouple, heating mantle, controller, nitrogen inlet and Dean-Stark trap/condenser, Bis Z (73.7990 g), Bis K (65.4600 g), anhydrous potassium carbonate (53.9019 g) were dissolved in a mixture DMSO and toluene, 540 ml and 270 ml respectively (about 20% solid concentration). The mixture was heated to toluene reflux with stirring, keeping the temperature at 140° C. for 4 h, then increasing the temperature to 175° C. for 4 h. The reaction mixture was precipitated into 2 L of methanol to get the crude product; then washed with hot DI water four times. The product was oven dried at 80C for one day and vacuum dried at 75C for 2 days.

In a 500 ml three necked round bottom flask, equipped with a mechanical stirrer, thermocouple, heating mantle, controller, nitrogen inlet and Dean-Stark trap/condenser, Bis Z (20.1270 g), S-Bis K sodium salt (28.1240 g), oligomer 24 (n=12) (31.2316 g), anhydrous potassium carbonate (13.5589 g) were dissolved in a mixture dimethylsulfoxide (DMSO) (300 ml) and toluene (100 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The dried sample (0.1250 g) was in 25 ml of dimethylacetamide (DMAc) to determine inherent viscosity. The inherent viscosity of the sodium salt polymer was found to be 0.490 dL/g.

Example 115

In a 500 ml three necked round bottom flask, equipped with a mechanical stirrer, thermocouple, heating mantle, controller, nitrogen inlet and Dean-Stark trap/condenser, Bis Z (16.1017 g), Bis K (6.3366 g), S-Bis K sodium salt (11.6552 g), oligomer 24 (n=8) (12.7379 g), anhydrous potassium carbonate (10.7841 g) were dissolved in a mixture dimethylsulfoxide (DMSO) (200 ml) and toluene (100 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The polymer was found to have an inherent viscosity of 0.66 dL/g in the proton form.

Example 116

In a 500 ml three necked round bottom flask, equipped with a mechanical stirrer, thermocouple, heating mantle, controller, nitrogen inlet and Dean-Stark trap/condenser, Bis Z (13.4180 g), S-Bis K sodium salt (17.5670 g), oligomer 24 (n=8) (31.8444 g), anhydrous potassium carbonate (8.9837 g) were dissolved in a mixture dimethylsulfoxide (DMSO) (250 ml) and toluene (125 ml) (about 20% solid concentration). The mixture was heated to toluene flux with stirring, keeping the temperature at 140° C. for 6 h, then increase temperature to 173-175° C. for 4-4.5 h. The reaction mixture was precipitated into 2 L of methanol. The polymer was then washed with DI water 4 times. The polymer was found to have an inherent viscosity of 0.83 dL/g in the proton form.

What is claimed is:

1. An ion conducting copolymer comprising a first hydrophobic oligomer and optionally a second hydrophobic oligomers, an ion conducting monomer and a linking monomer to link said oligomers and said monomers;

wherein said first hydrophobic oligomer has the formula $(AB)_mA$ or $(BA)_mB$; and wherein said second hydrophobic oligomer has the formula $(CD)_nC$ or $(DC)_nD$ and said first and second hydrophobic oligomers are the same or different;

wherein $(AB)_mA$ has the formula $-(Ar_1X_1-Ar_2-X_2Ar_3-X_3)_m-Ar_1X_1-Ar_2-)_a$ and $(BA)_mB$ has the formula $(Ar_3-X_3-Ar_1-X_1Ar_2X_2)_m-Ar_3)_a$ wherein $(CD)_n$ C has the formula $(Ar_4-X_4-Ar_5-X_5-Ar_6-X_6)_n-Ar_4-X_4-Ar_5-)_b$ and $(DC)_nD$ has the formula $(Ar_6-X_6-Ar_4-X_4-Ar_5-X_5)_n-Ar_6)_b$;

wherein said ion conducting monomer has the formula $(Ar_7-X_7-Ar_8)_c$; and wherein said linking monomer has the formula $-R_1-Ar_9-Y-Ar_{10}-R_2-$ where $Ar_1$, $Ar_2$, $Ar_4$, $Ar_5$, $Ar_7$, $Ar_8$, $Ar_9$ $Ar_{10}$, are independently phenyl, substituted phenyl, napthyl, terphenyl, aryl nitrile, substitute aryl nitrile, and one or more of $Ar_7$ and/or one or more of $Ar_8$ further comprise an ion conducting group, $X_1$ and $X_4$ are independently $-C(O)-$ or $-S(O)_2-X_2$, $X_3$, $X_5$ and $X_6$ are independently $-O$ — or —S—; $X_7$ is a bond, —C(O)— or $S(O)_2$—, $Ar_3$ and $Ar_6$ are the same or different from each other and are

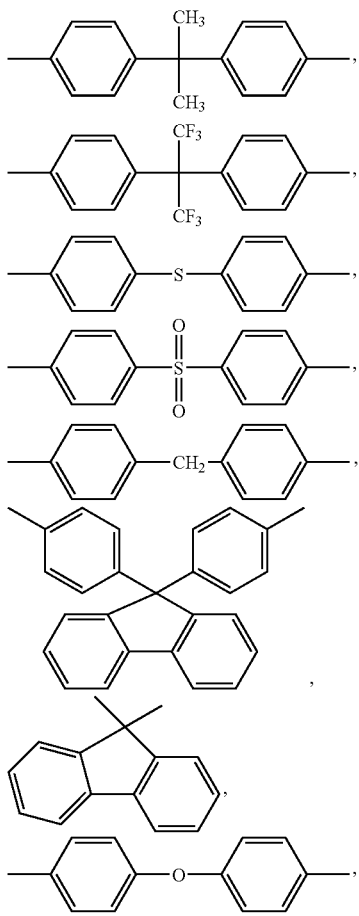

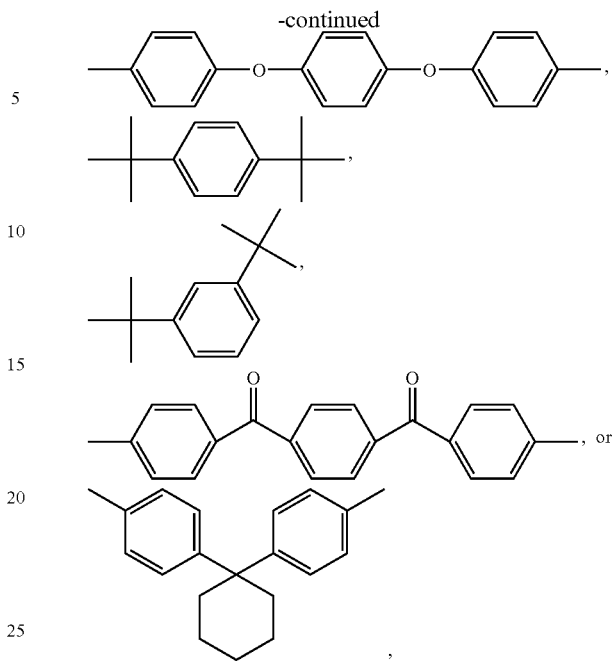

wherein the ion conductive groups comprise $SO_3^-$, —COO$^-$, $H_2PO_3^-$ or sulfonimide; $R_1$ and $R_2$ are independently —O- or —S—, wherein a and c are independently between 0.01 and 0.98, b is 0 or between 0.01 and 0.98 and a +b+c=1, wherein m is between 1 and 12, n is between 1 and 12, and wherein Y is a bond, —C(O)—, or —S(O$_2$)—, and $Ar_{10}$ may be present or absent when Y is a bond.

2. The ion conducting copolymer of claim 1 wherein said first and second hydrophobic oligomers are different.

3. The ion conducting oligomer of claim 2 having the formula

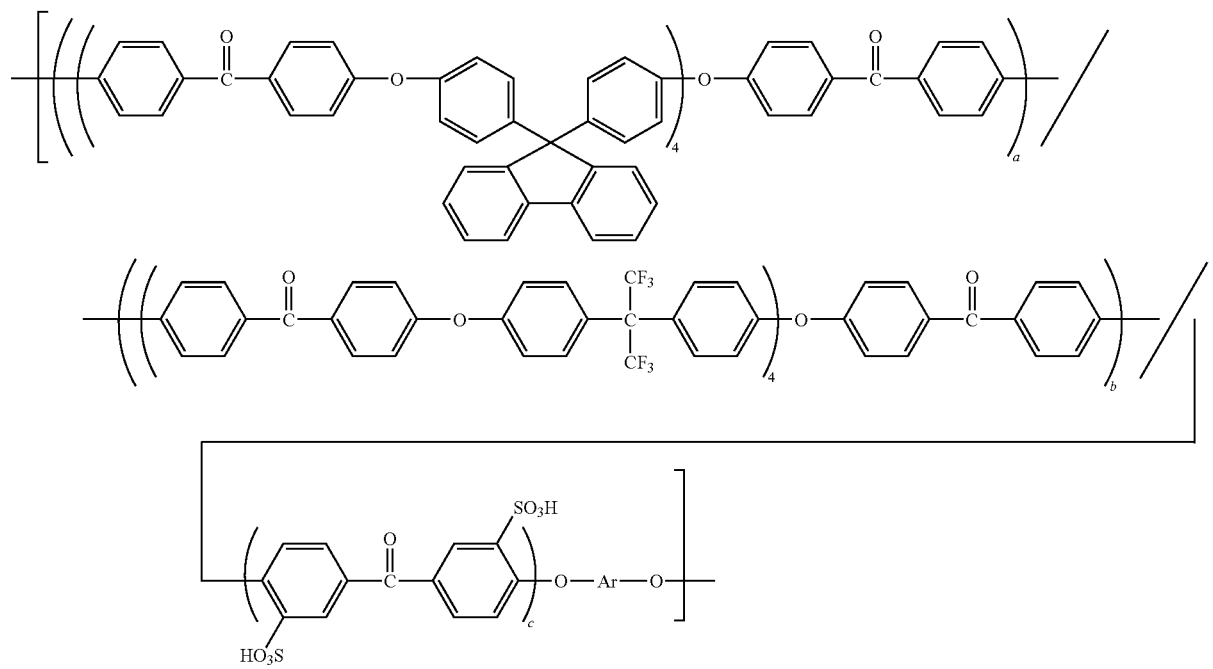

wherein Ar is : 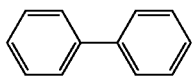 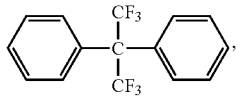, or 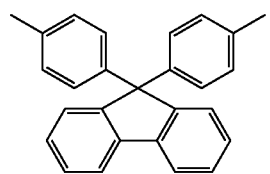

wherein a is between 0.05 and 0.2, b is between 0.01 and 0.2 and c is between 0.5 and 0.95.

4. The ion conducting copolymer of claim 2 having the formula

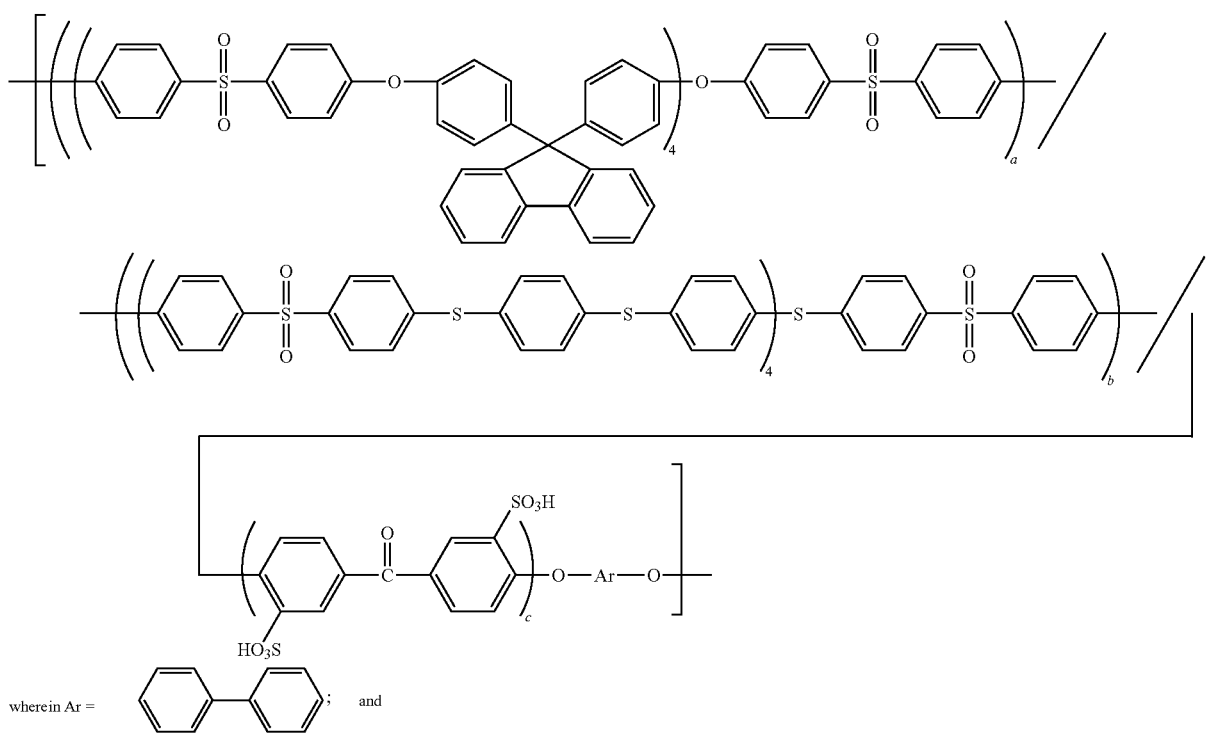

wherein Ar = [biphenyl structure]; and wherein a is between 0.05 and 0.4, b is between 0.01 and 0.04 and c is between 0.2 and 0.94.

5. Then ion conducting polymer of claim 4 where a =0.13, b =0.036, c =0.834.

6. A polymer electrolyte membrane (PEM) comprising the ion conducting copolymer of any of claims 1-5.

7. A catalyst coated membrane (CCM) comprising the PEM of claim 6 wherein all or part or part of at least one opposing surface of said PEM comprises a catalyst layer.

8. A membrane electrode assembly (MEA) comprising the CCM of claim 7.

9. A membrane electrode assembly (MEA) comprising the PEM of claim 1.

10. A fuel cell comprising the MEA of claim 8 or 9.

11. The fuel cell of claim 10 comprising a hydrogen fuel cell.

12. An electronic device comprising the fuel cell of claim 11.

13. A power supply comprising the fuel cell of claim 11.

14. An electric motor comprising the fuel cell of claim 11.

15. A vehicle comprising the fuel cell of claim 11.

16. The fuel cell of claim 10 comprises a methanol fuel cell.

17. An electronic device comprising the fuel cell of claim 16.

18. A power supply comprising the fuel cell of claim 16.

19. An electric motor comprising the fuel cell of claim 16.

20. A vehicle comprising the fuel cell of claim 16.

* * * * *